United States Patent
Luo et al.

(10) Patent No.: US 12,542,737 B2
(45) Date of Patent: Feb. 3, 2026

(54) METHOD AND NETWORK ELEMENT FOR NETWORK REDUNDANCY

(71) Applicant: Telefonaktiebolaget LM Ericsson (publ), Stockholm (SE)

(72) Inventors: Wei Luo, Beijing (CN); Xing Yang, Beijing (CN); Hua Lv, Beijing (CN); Kun Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 340 days.

(21) Appl. No.: 18/036,526

(22) PCT Filed: Dec. 31, 2020

(86) PCT No.: PCT/CN2020/142255
§ 371 (c)(1),
(2) Date: May 11, 2023

(87) PCT Pub. No.: WO2022/141440
PCT Pub. Date: Jul. 7, 2022

(65) Prior Publication Data
US 2023/0403228 A1  Dec. 14, 2023

(51) Int. Cl.
*H04L 45/28* (2022.01)
*H04L 45/00* (2022.01)

(52) U.S. Cl.
CPC .............. *H04L 45/28* (2013.01); *H04L 45/22* (2013.01)

(58) Field of Classification Search
CPC ....... H04L 45/28; H04L 45/22; H04L 45/026; H04L 45/04
See application file for complete search history.

(56) References Cited

U.S. PATENT DOCUMENTS 8,724,456 B1 * 5/2014 Hong .................. G06F 11/3055
370/225
2010/0085972 A1  4/2010  Yan et al.
(Continued)

FOREIGN PATENT DOCUMENTS

| CN | 105939215 A | 9/2016 |
| CN | 106572012 A | 4/2017 |
| WO | 2017175033 A1 | 10/2017 |

OTHER PUBLICATIONS

Extended European Search Report and Opinion for European Patent Application No. 20967779.8 dated Jun. 7, 2024, 7 pages.
(Continued)

*Primary Examiner* — Yaotang Wang
(74) *Attorney, Agent, or Firm* — Sage Patent Group

(57) ABSTRACT

The present disclosure is related to a method and network element for network redundancy. The method may be performed at a first network element for providing a service together with a plurality of second network elements in a redundant manner. The method includes: determining whether the first network element is to function as an active network element or a standby network element for a first route at least partially based on a first priority of the first network element and/or whether the first route is advertised by at least one of the plurality of the second network elements; and advertising, in a standby state, the first route in response to determining that the first network element is to function as a standby network element for the first route.

19 Claims, 16 Drawing Sheets

(56) References Cited

U.S. PATENT DOCUMENTS

| | | |
|---|---|---|
| 2010/0220656 A1 | 9/2010 | Ramankutty et al. |
| 2011/0032945 A1 | 2/2011 | Mullooly et al. |
| 2013/0258839 A1 | 10/2013 | Wang et al. |
| 2014/0095688 A1 | 4/2014 | O'Connor et al. |
| 2018/0069716 A1* | 3/2018 | Bhat ................ H04L 45/03 |

OTHER PUBLICATIONS

International Search Report and Written Opinion of the International Searching Authority, PCT/CN2020/142255, mailed Aug. 30, 2021, 8 pages.

Rekhter, Y. et al., "A Border Gateway Protocol 4 (BGP-4)," Network Working Group, Request for Comments—RFC 4271, Jan. 2006, 104 pages.

* cited by examiner

METHOD AND NETWORK ELEMENT FOR NETWORK REDUNDANCY

CROSS REFERENCE TO RELATED APPLICATIONS

This application is a 35 U.S.C. § 371 national stage application of PCT International Application No. PCT/CN2020/142255 filed on Dec. 31, 2020, the disclosure and content of which is incorporated by reference herein in its entirety.

TECHNICAL FIELD

The present disclosure is related to the field of networking technology, and in particular, to a method and network element (NE) for network redundancy.

BACKGROUND

Nowadays, telecommunication networks have become an indispensable part of our daily life, and therefore it is particularly important and crucial for network elements in the networks, especially for the network elements providing crucial services, to operate in a reliable and robust manner. It is generally desirable to prevent service outages and/or loss of network traffic. Commonly, such service outages and/or loss of network traffic may tend to occur when there is a failure in a hardware resource of a network element or a software process crash. For example, a control card or line card of the network element may fail, or a daemon process may crash.

One approach to help reduce the risks of service outages and/or loss of network traffic is to provide redundant or backup hardware resources in the networks. For example, a network may include a pair of network elements where one network element represents an active network element and the other network element represents a standby or backup network element. The active network element may be responsible for handling traffic, and may synchronize data sufficient to handle the traffic to the standby network element. The standby network element may serve as a hot standby or backup network element that is capable of becoming active and handling the traffic if the active network element fails.

However, such a mechanism is cumbersome and error prone since it requires user knowledge of the network and user's manual configuration, and therefore is not user friendly and degrade the user experience.

SUMMARY

According to a first aspect of the present disclosure, a method at a first network element for providing a service together with a plurality of second network elements in a redundant manner is provided. The method may comprise: it is determined whether the first network element is to function as an active network element or a standby network element for a first route at least partially based on a first priority of the first network element and/or whether the first route is advertised by at least one of the plurality of the second network elements. Further, the method may further comprise: the first route is advertised, in a standby state, in response to determining that the first network element is to function as a standby network element for the first route.

In some embodiments, the step of determining whether the first network element is to function as an active network element or a standby network element for a first route comprises: it is determined that the first network element is to function as an active network element for the first route in response to determining that the first priority is high and that the first route is not advertised by any of the plurality of second network elements during a period of time. Further, the method may further comprise: the first route is advertised in an active-without-standby state.

In some embodiments, the method may further comprise: a message indicating that the second network element is a standby network element for the first route is received from one of the plurality of second network elements. Further, the method may further comprise: the first route is advertised in an active-with-standby state. In some embodiments, the method may further comprise: it is determined that the second network element is no longer the standby network element for the first route by not receiving a heartbeat message from the second network element for a period of time. Further, the method may further comprise: the first route is advertised in an active-without-standby state.

In some embodiments, the method may further comprise: it is advertised that the first route is withdrawn in response to determining that the first network element cannot provide the service for the first route any longer. In some embodiments, the method may further comprise: the first route is advertised, in a standby state, in response to determining that the first network element is to function as a standby network element for the first route by receiving an advertisement from a second network element advertising the first route. In some embodiments, the method may further comprise: the first route is advertised, in an active-without-standby state, in response to determining that the first network element is to function as an active network element for the first route by receiving an advertisement in which the first route is withdrawn by a second network element.

In some embodiments, the step of determining whether the first network element is to function as an active network element or a standby network element for a first route may comprise: it is determined that the first network element is to function as a standby network element in response to determining that the first priority is high and that the first route is advertised by one of the plurality of second network elements.

In some embodiments, the step of determining whether the first network element is to function as an active network element or a standby network element for a first route may comprise: it is determined that the first network element is to function as a standby network element for the first route in response to determining that the first priority is low and that the first route is advertised by one of the plurality of second network elements. In some embodiments, the method may further comprise: the first route is advertised, in an active-without-standby state, in response to determining that the first network element is to function as an active network element for the first route by receiving an advertisement in which the first route is withdrawn by a second network element.

In some embodiments, the method may further comprise: a message indicating that the second network element is a standby network element for the first route is received from one of the plurality of second network elements. Further, the method may further comprise: the first route is advertised in an active-with-standby state. In some embodiments, the method may further comprise: a message indicating that the second network element is no longer the standby network element for the first route is received from the second network element or another second network element. The method may further comprise: the first route is advertised in an active-without-standby state.

In some embodiments, the method may further comprise: it is advertised that the first route is withdrawn in response to determining that the first network element cannot provide the service for the first route any longer. In some embodiments, the method may further comprise: the first route is advertised, in a standby state, in response to determining that the first network element is to function as a standby network element for the first route by receiving an advertisement from a second network element advertising the first route.

In some embodiments, the method may further comprise: it is determined that the first network element is to function as a standby network element for one or more additional routes in response to determining that the one or more additional routes are advertised by one or more second network elements.

In some embodiments, the method may further comprise: it is determined that the first network element is to function as an active network element for a route selected from the first route and the one or more additional routes in response to an advertisement in which the selected route is withdrawn is received. Further, the method may further comprise: the selected route is advertised in an active-without-standby state. Further, the method may further comprise: it is advertised that the first route and the one or more additional routes other than the selected route is withdrawn. Further, the method may further comprise: a message indicating that the first network element is no longer a standby network element for a corresponding route is transmitted to each of the second network elements other than the second network element corresponding to the selected route.

In some embodiments, each of the first network element and the plurality of second network elements may support the Border Gateway Protocol (BGP), and a route is advertised by a corresponding network element by using an autonomous system (AS) identifier of the corresponding network element in a path field of the route. In some embodiments, a network element in an active state, a network element in a standby state, and a network element in other states may advertise their routes with pre-configured AS identifiers which are different from each other, respectively. In some embodiments, AS identifiers pre-configured for a network element in an active state, a network element in a standby state, and a network element in other states have different numbers of repetitions of the AS identifiers, respectively. In some embodiments, a network element in other states may advertise its route with a number of repetitions of a pre-configured AS identifier based on its priority. In some embodiments, a network element in an active state may have a fewer number of repetitions of the AS identifier than a network element with a priority of high in other states, which may have a fewer number of repetitions of the AS identifier than a network element with a priority of low in other states, which may have a fewer number of repetitions of the AS identifier than a network element in a standby state.

According to a second aspect of the present disclosure, a network element is provided. The network element may comprise a processor and a memory. The memory may store instructions which, when executed by the processor, cause the processor to perform any method of the first aspect.

According to a third aspect of the present disclosure, a network element is provided. The network element may comprise a determining module and an advertising module. The determining module may be configured for determining whether the first network element is to function as an active network element or a standby network element for a first route at least partially based on a first priority of the first network element and/or whether the first route is advertised by at least one of the plurality of the second network elements. The advertising module may be configured for advertising, in a standby state, the first route in response to determining that the first network element is to function as a standby network element for the first route.

According to a fourth aspect of the present disclosure, a computer program comprising instructions is provided. The instructions, when executed by at least one processor, cause the at least one processor to carry out any method of the first aspect and.

According to a fifth aspect of the present disclosure, a carrier containing the computer program of the third aspect is provided. The carrier is one of an electronic signal, optical signal, radio signal, or computer readable storage medium.

According to a sixth aspect of the present disclosure, a routing system is provided. The routing system may comprise a plurality of network elements of the second aspect and/or the third aspect. One of the plurality of network elements may function as a standby network element for rest of the network elements.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and therefore are not to be considered limiting of its scope, the disclosure will be described with additional specificity and detail through use of the accompanying drawings.

DETAILED DESCRIPTION

Figure 1:
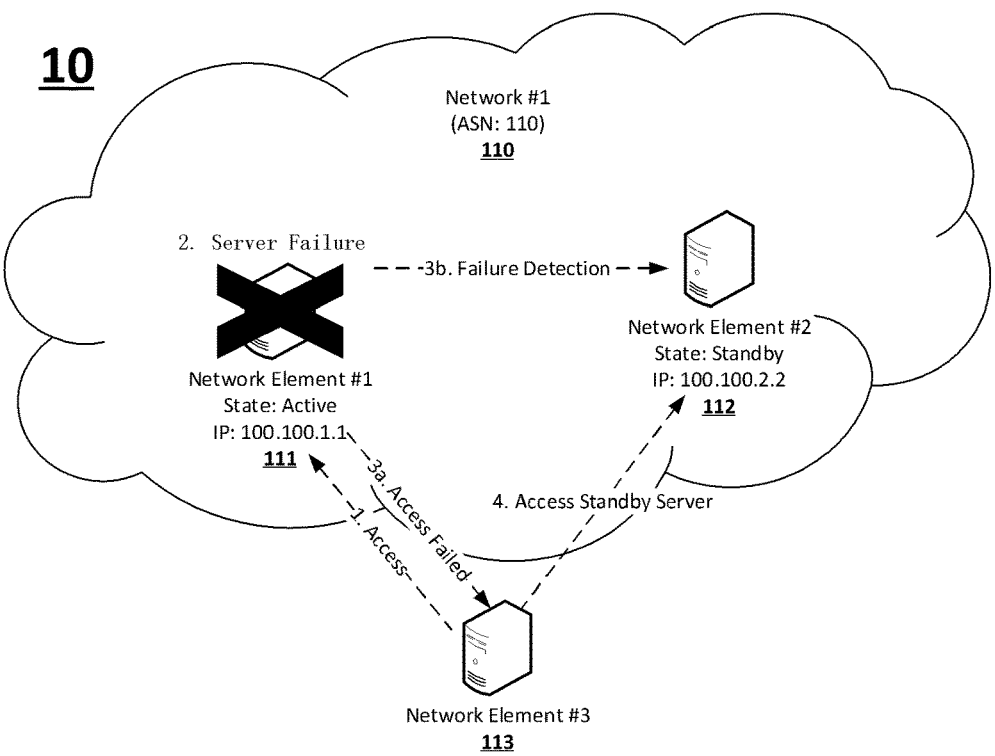
FIG. 1 is a diagram illustrating an exemplary scenario in which a conventional network redundancy mechanism is adopted.

Hereinafter, the present disclosure is described with reference to embodiments shown in the attached drawings.

However, it is to be understood that those descriptions are just provided for illustrative purpose, rather than limiting the present disclosure. Further, in the following, descriptions of known structures and techniques are omitted so as not to unnecessarily obscure the concept of the present disclosure.

Those skilled in the art will appreciate that the term "exemplary" is used herein to mean "illustrative," or "serving as an example," and is not intended to imply that a particular embodiment is preferred over another or that a particular feature is essential. Likewise, the terms "first", "second", "third", "fourth," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Conditional language used herein, such as "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below. In addition, language such as the phrase "at least one of X, Y and Z," unless specifically stated otherwise, is to be understood with the context as used in general to convey that an item, term, etc. may be either X, Y, or Z, or a combination thereof.

The terminology used herein is for the purpose of describing particular embodiments only and is not intended to be limitation of example embodiments. As used herein, the singular forms "a", "an", and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. It will be also understood that the terms "connect(s)," "connecting", "connected", etc. when used herein, just mean that there is an electrical or communicative connection between two elements and they can be connected either directly or indirectly, unless explicitly stated to the contrary.

Of course, the present disclosure may be carried out in other specific ways than those set forth herein without departing from the scope and essential characteristics of the disclosure. One or more of the specific processes discussed below may be carried out in any electronic device comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure will be illustrated in the accompanying Drawings and described in the following Detailed Description, it should be understood that the disclosure is not limited to the disclosed embodiments, but instead is also capable of numerous rearrangements, modifications, and substitutions without departing from the present disclosure that as will be set forth and defined within the claims.

Further, please note that although the following description of some embodiments of the present disclosure is given in the context of border gateway protocol 4 (BGP-4), the present disclosure is not limited thereto. In fact, as long as network redundancy is involved, the inventive concept of the present disclosure may be applicable to any appropriate network technology, for example, to Wi-Fi, Bluetooth, Ethernet, Global System for Mobile Communications (GSM)/General Packet Radio Service (GPRS), Enhanced Data Rates for GSM Evolution (EDGE), Code Division Multiple Access (CDMA), Wideband CDMA (WCDMA), Time Division-Synchronous CDMA (TD-SCDMA), CDMA2000, Worldwide Interoperability for Microwave Access (WiMAX), Wireless Fidelity (Wi-Fi), 4th Generation Long Term Evolution (LTE), LTE-Advance (LTE-A), or 5th Generation New Radio (5G NR), etc. Therefore, one skilled in the arts could readily understand that the terms used herein may also refer to their equivalents in any other infrastructure. For example, the term "network element" used herein may refer to a network device, a network node, a network appliance, a network entity, a router, a bridge, a switch, a relay, an IoT device (such as, a vehicle, a home appliance, a wearable device, etc.), a field device, a terminal device, a mobile device, a mobile terminal, a mobile station, a user device, a user equipment (UE), a user terminal, a wireless device, a wireless terminal, or any other equivalents.

Further, a following Internet Engineering Task Force (IETF) document is incorporated herein by reference in its entirety:

IETF Request For Comment (RFC) 4271, A Border Gateway Protocol 4 (BGP-4), January 2006.

Before some embodiments of the present disclosure are described, some terms will be explained first.

Autonomous System (AS): The classic definition of an Autonomous System is a set of routers under a single technical administration, using an interior gateway protocol (IGP) and common metrics to determine how to route packets within the AS, and using an inter-AS routing protocol to determine how to route packets to other ASes. Since this classic definition was developed, it has become common for a single AS to use several IGPs and, sometimes, several sets of metrics within an AS. The use of the term Autonomous System stresses the fact that, even when multiple IGPs and metrics are used, the administration of an AS appears to other ASes to have a single coherent interior routing plan, and presents a consistent picture of the destinations that are reachable through it.

AS number (ASN): A unique ASN is allocated to each AS for use in BGP routing. The numbers are assigned by Internet Assigned Numbers Authority (IANA) and the Regional Internet Registries (RIR), the same authorities that allocate IP addresses. There are public numbers, which may be used on the Internet and range from 1 to 64511, and private numbers from 64512 to 65535, which can be used within an organization.

Route: A unit of information that pairs a set of destinations with the attributes of a path to those destinations. The set of destinations are systems whose IP addresses are contained in one IP address prefix carried in the Network Layer Reachability Information (NLRI) field of an UPDATE message. The path is the information reported in the path attributes field of the same UPDATE message.

FIG. 1 is a diagram illustrating an exemplary scenario 10 in which a conventional network redundancy mechanism is adopted. As shown in FIG. 1, a pair of network elements 111 and 112 is providing a service (such as, a media streaming service, a routing service, an authentication service, or the like) in a redundant manner in a network #1 110. As shown in FIG. 1, the network element #1 111 is currently providing the service and act as the active network element for the service while the network element #2 112 is currently serving as a standby/backup server for the network element #1 111.

At step 1, a network element #3 113 may access the service provided by the network element #1 111, and then at step 2, the network element #1 111 cannot provide its service any longer, for example, due to hardware failure, software crash, or network link failure. In such a case, at step 3a, the network element #3 cannot access the service while at step 3b, the standby network element #2 112 may detect such a server failure event, for example, by not receiving a heartbeat message from the network element #1 111 for a certain period of time. At step 4, the network element #3 113 may access the service from the network element #2 112, for example, by manually changing the IP address for the service from 100.100.1.1 of the NE #1 111 to 100.100.2.2 of the NE #2 112.

However, as mentioned above, such a network redundancy mechanism will typically require the user at the NE #3 113 to know the details of the network 110, or at least the IP address of the network element #2 112, and to perform a cumbersome and error prone manual configuration of the client at the network element #3 113. Therefore, such a conventional redundancy mechanism is not user friendly. Further, the mechanism shown in FIG. 1 can support 1 plus 1 model only, that is, one standby NE (e.g., the NE #2 112) for one active NE (e.g., the NE #1 111) only, and such a configuration is a waste of resources to some extent.

To solve or at least partially alleviate the above issues, some embodiments of the present disclosure propose a network redundancy solution in which network elements may automatically determine their operational states and navigate the network traffic to its proper destination without any human interaction. Next, an embodiment of the present disclosure will be described in detail with reference to FIG. 2A to 2H and FIG. 3A to FIG. 3B.

FIG. 2A to FIG. 2H are diagrams illustrating different stages of an exemplary scenario 10 in which a network redundancy mechanism according to an embodiment of the present disclosure is applied. FIG. 3A and FIG. 3B are diagrams illustrating exemplary state machines for NEs with different priorities according to an embodiment of the present disclosure. Please note that the scenario 10 shown in FIG. 2A to 2H is substantially similar to the scenario 10 shown in FIG. 1 with different redundancy mechanisms deployed, and therefore corresponding NEs are referred to by similar reference numerals.

Figure 2A:
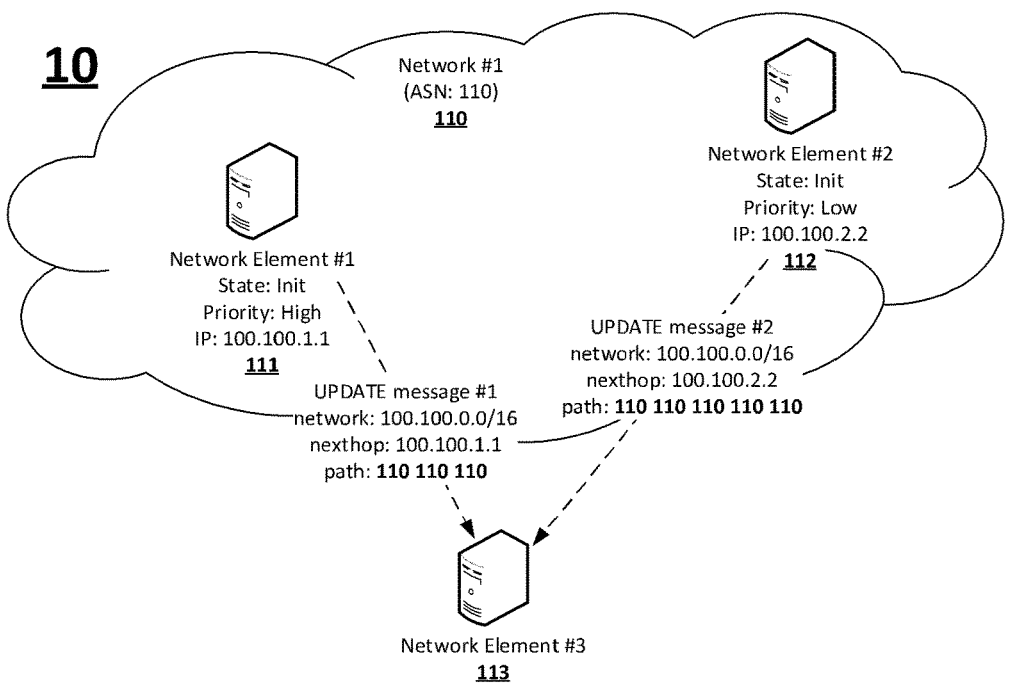
FIG. 2A to FIG. 2H are diagrams illustrating different stages of an exemplary scenario in which a network redundancy mechanism according to an embodiment of the present disclosure is applied.
Figure 3A:
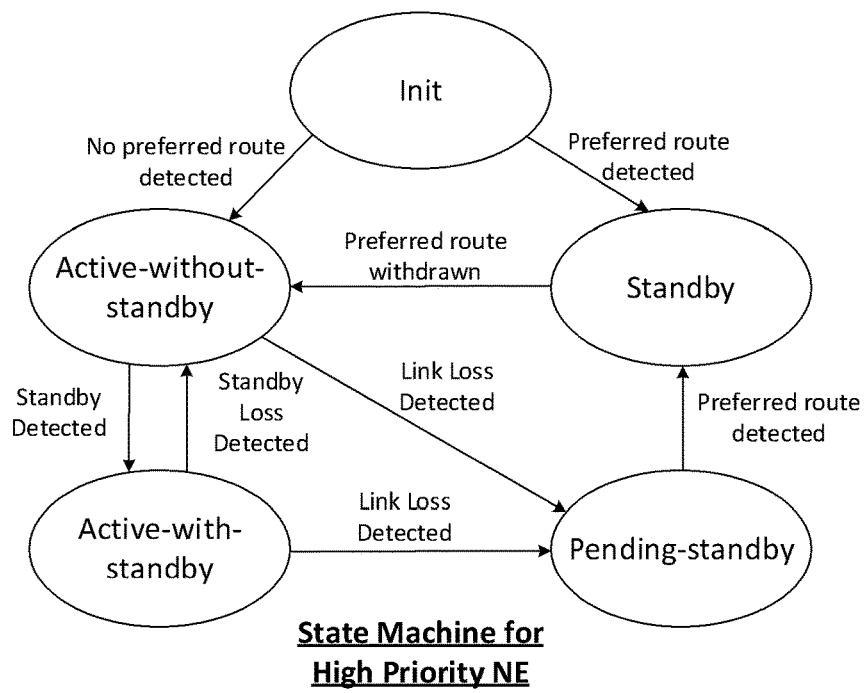
FIG. 3A and FIG. 3B are diagrams illustrating exemplary state machines for NEs with different priorities according to an embodiment of the present disclosure.
Figure 3B:
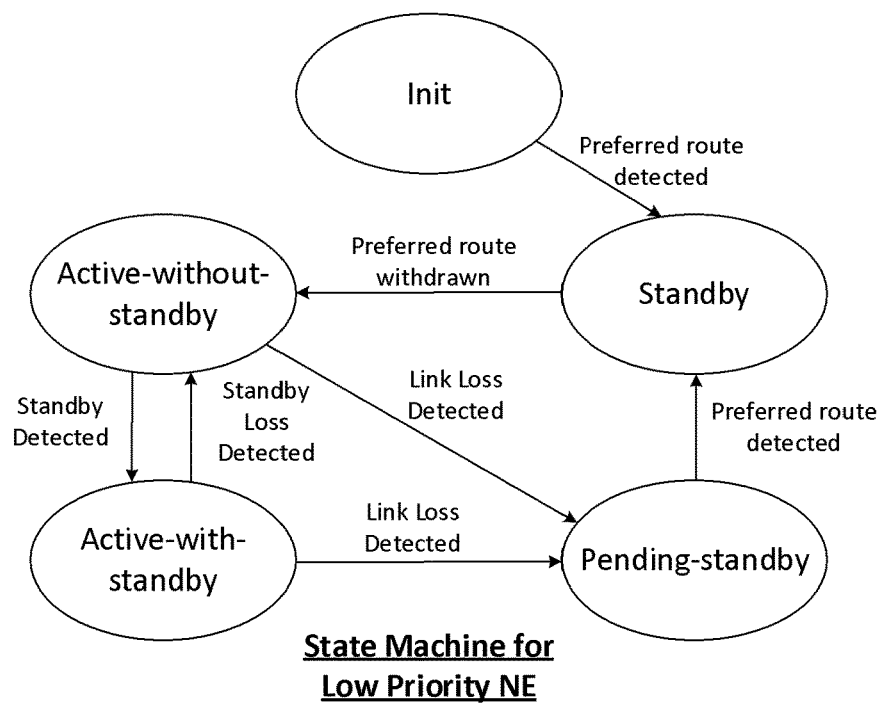

As shown in FIG. 2A, the network #1 110 may comprise a network element #1 111, which is expected to operate as the active NE, and a network element #2 112, which is expected to operate as the standby NE, similar to those shown in FIG. 1. To this end, the NE #1 111 may be assigned with a high priority while the NE #2 112 may be assigned with a low priority, and therefore they can be operated under the control of their state machines shown in FIG. 3A and FIG. 3B, respectively.

Referring back to FIG. 2A, when the NE #1 111 and the NE #2 112 are powered up and enter into their "Init" states, respectively, the NE #1 111 may advertise its route for the service to another NE #3 113, for example, by a BGP UPDATE message #1 as shown in FIG. 2A. Please note that although it is shown in FIG. 2A that the UPDATE message #1 is transmitted by the NE #1 111 itself, the present disclosure is not limited thereto. In some other embodiments, such an UPDATE message may be transmitted by some other NE which is in charge of service routing or service exposure, on behalf of the NE #1 111 which is actually providing the service. That is, the NE #3 113 may discover the service hosted by the NE #1 111 through a service exposure function provided by another network element. Similarly, in some embodiments, any UPDATE message mentioned herein may be transmitted by another NE rather than the NE shown in the figures. However, for the purpose of simplicity and brevity of the description, the UPDATE messages may be transmitted by the NEs at which the service is hosted without loss of generality.

As shown in FIG. 2A, the UPDATE message #1 may comprise, among other information, the destination of the route ("network: 100.100.0.0/16"), the IP address that should be used as the next hop to the destination ("nexthop: 100.100.1.1"), and the AS path of the route ("path: 110 110"). According to the RFC 4271, when a BGP node advertises a route, its AS number should be appended to the AS path attribute in the UPDATE message. Typically, the BGP node may append its AS number to the AS path attribute once. However, to achieve the automatic network redundancy according to some embodiments of the present disclosure, different number of repetitions of the AS ID in the AS path of the route may be used for different network elements with different priorities and/or in different states. Table 1 is an exemplary configuration of number of repetitions of the AS ID for different NEs with different priorities in different states.

TABLE 1

Configuration of number of repetitions of AS ID in AS path

| Priority | State | | |
| --- | --- | --- | --- |
| | Active | Standby | Others |
| High | least | most | second least |
| Low | least | most | second most |

Figure 2B:
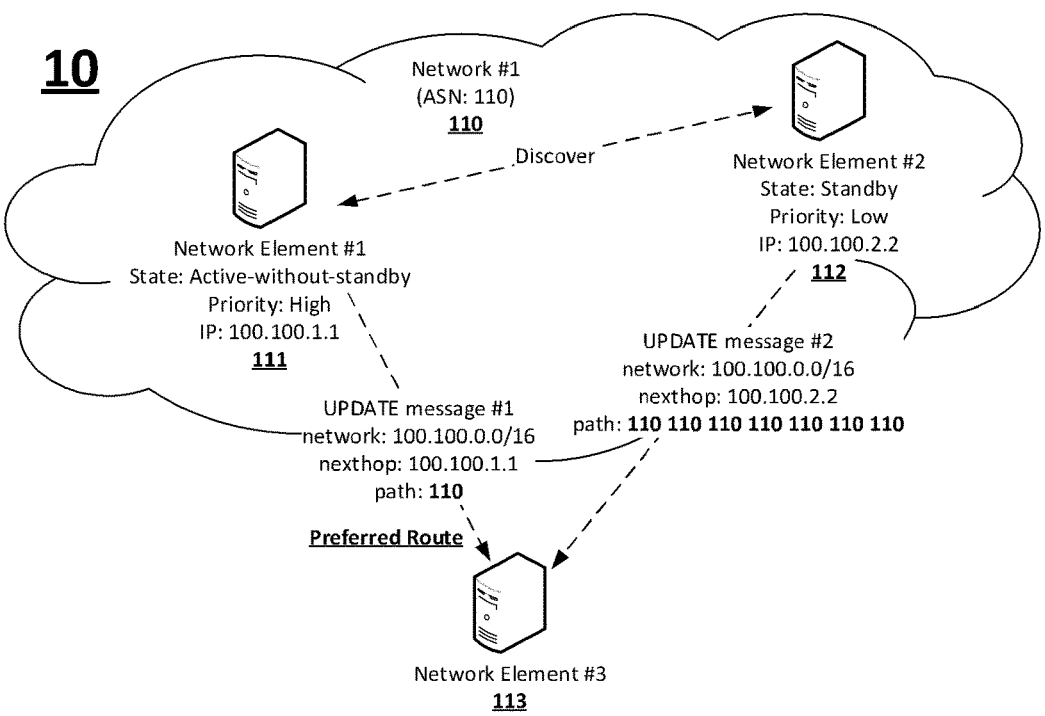
Figure 2C:
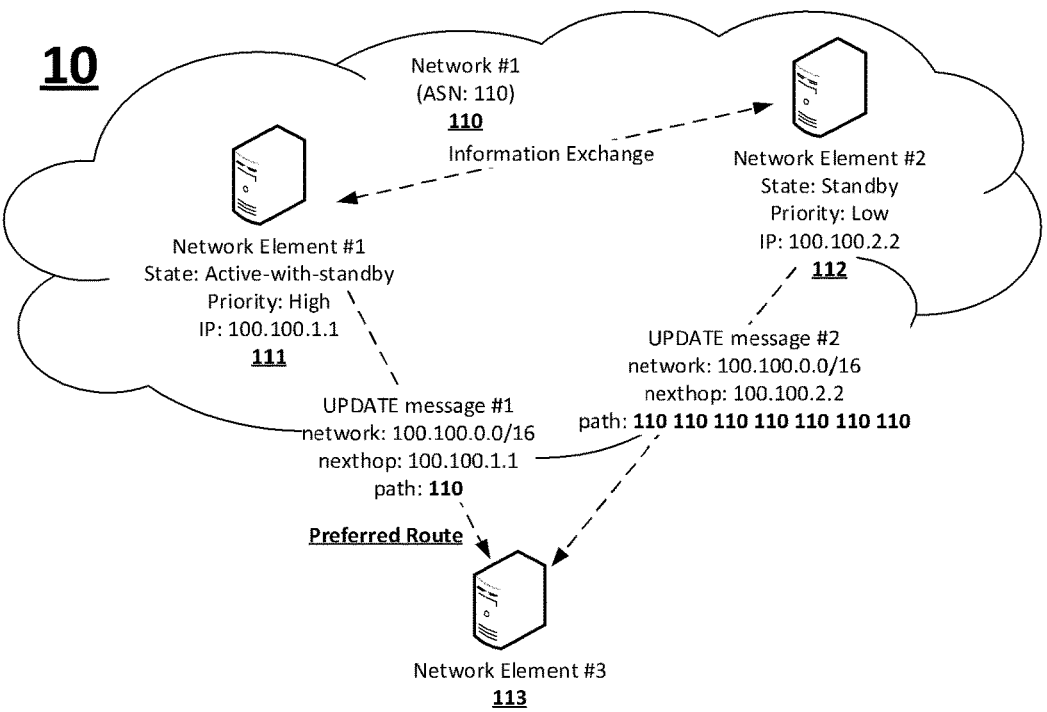
Figure 2D:
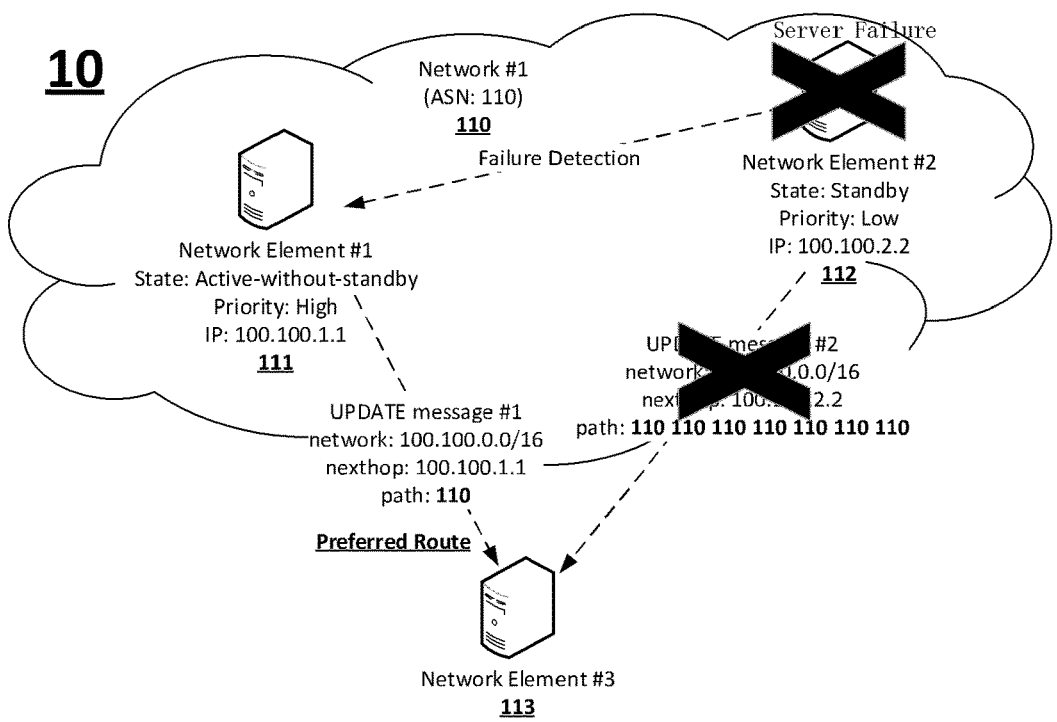
Figure 2E:
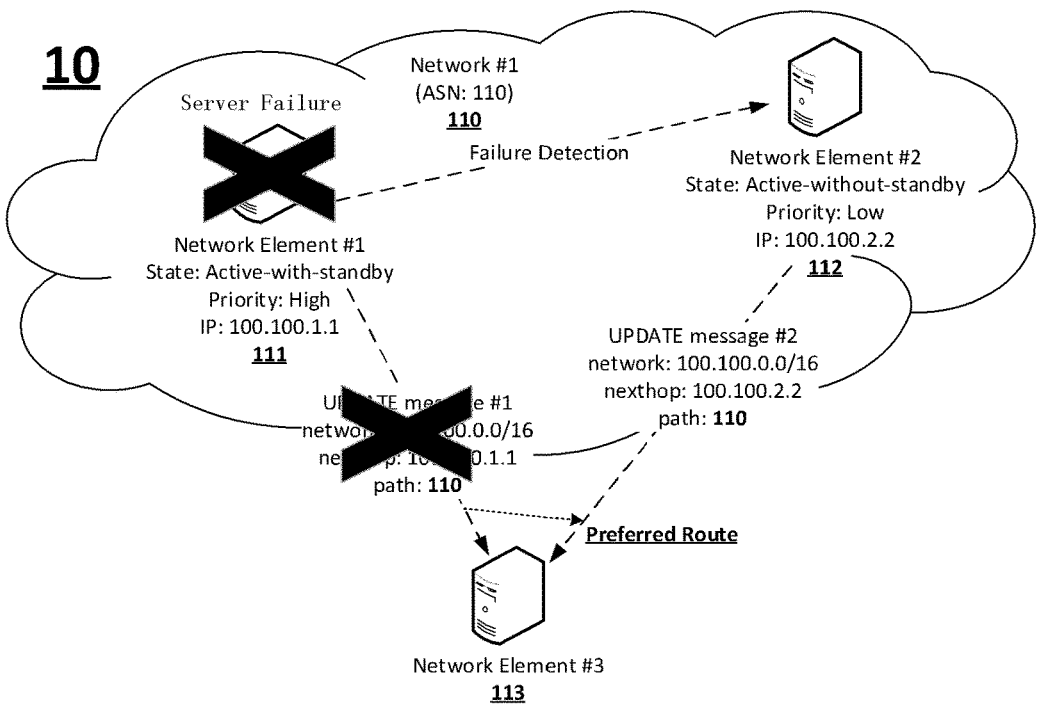
Figure 2F:
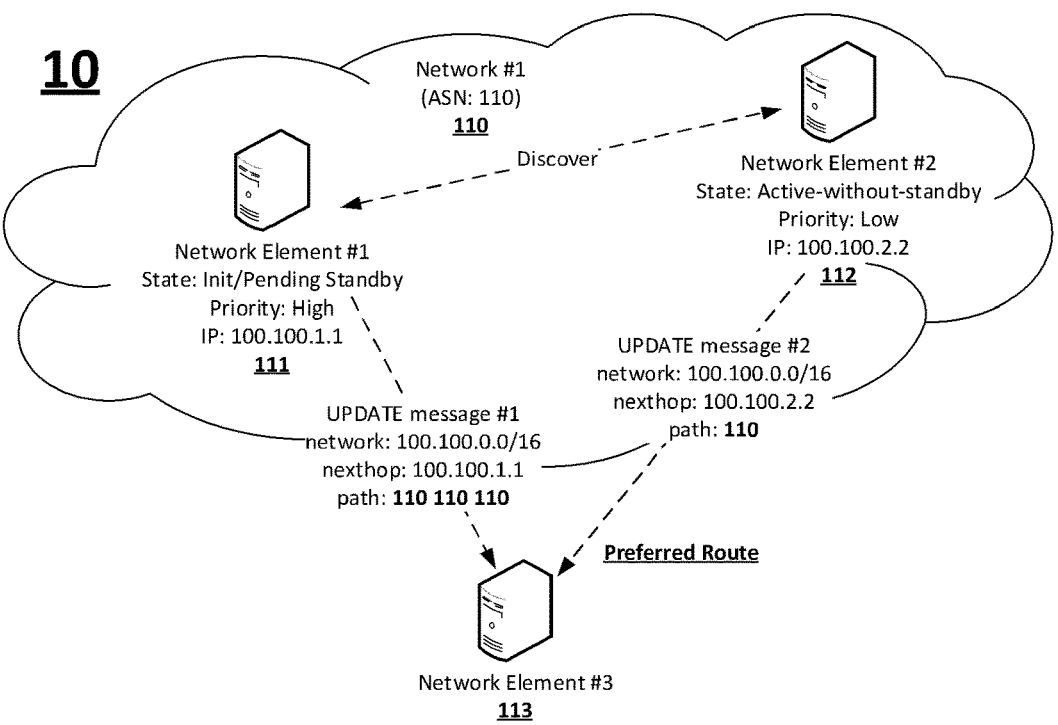
Figure 2G:
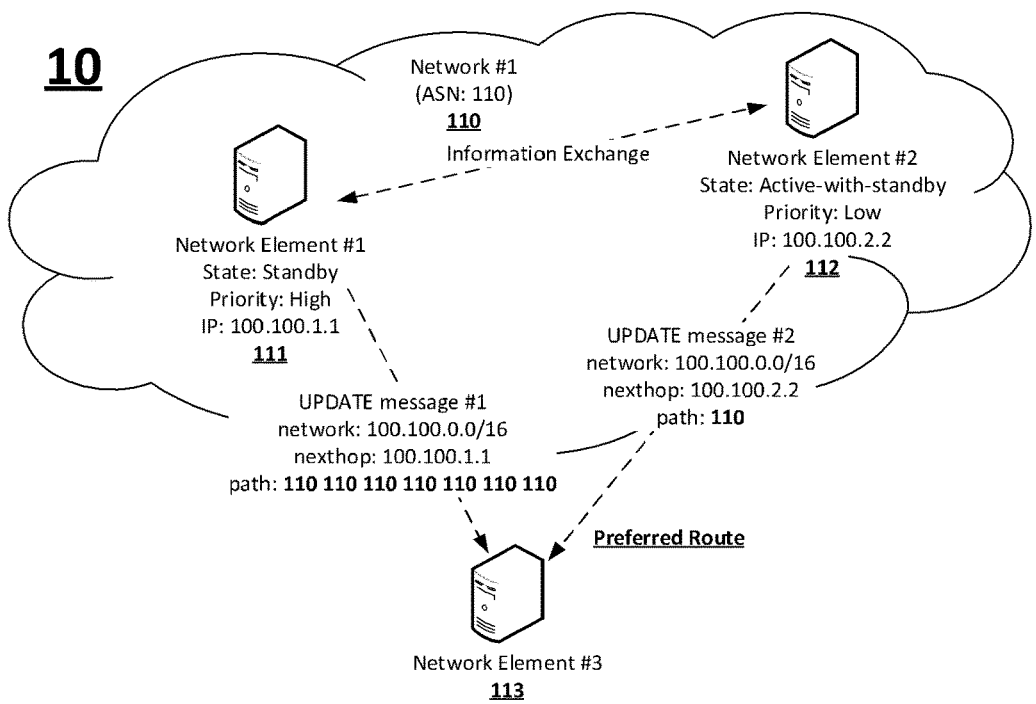

For example, an NE in the active state may advertise its UPDATE message with one repetition of its AS ID in the UPDATE message, for example, "path: 110" as shown in FIG. 2B and FIG. 2F, no matter whether its priority is high or low. For another example, an NE with a high priority in other states than "Active" and "Standby" may advertise its UPDATE message with three repetitions of its AS ID in the UPDATE message, for example, "path: 110 110 110" as shown in FIG. 2A. For yet another example, an NE with a low priority in other states than "Active" and "Standby" may advertise its UPDATE message with five repetitions of its AS ID in the UPDATE message, for example, "path: 110 110 110 110 110" as shown in FIG. 2A. For a further example, an NE in the standby state may advertise its UPDATE message with seven repetitions of its AS ID in the UPDATE message, for example, "path: 110 110 110 110 110 110 110" as shown in FIG. 2B and FIG. 2G, no matter whether its priority is high or low.

With this configuration, the NE #3 may determine that the NE #1 111 is preferred to be the active NE over the NE #2 112 upon reception of the UPDATE messages from the NE #1 111 and the NE #2 112 because the UPDATE message #1 comprises three repetitions of AS ID "110" which indicates that the NE #1 111 is a high priority NE.

However, the configuration of the number of repetitions is not limited to Table 1. In fact, as long as an NE which receives UPDATE messages can distinguish between NEs with different priority and/or different states from the received UPDATED messages, any configuration is appropriate. For example, the following tables of configurations are also possible.

TABLE 2

Configuration of number of repetitions of AS ID in AS path

| | State | | |
|---|---|---|---|
| Priority | Active | Standby | Others |
| High | 1 | 15 | 5 |
| Low | 1 | 15 | 10 |

TABLE 3

Configuration of number of repetitions of AS ID in AS path

| | State | | |
|---|---|---|---|
| Priority | Active | Standby | Others |
| High | 4 | 1 | 3 |
| Low | 4 | 1 | 2 |

Please note that the table 3 may not be compatible with the NEs which are not aware of such a configuration because a conventional BGP node will typically select a route with less AS IDs in the AS path attribute. In other words, if the NE #3 113 is not aware of such a configuration, then the NE #3 113 will typically select the NE #2 112 as the active NE for the service.

Further, in some other embodiments, other means to distinguish one NE from another NE from the UPDATE message may be used. For example, a new field or attribute may be added into the UPDATE message to indicate the states and/or priorities of the NE. For another example, different combinations of AS IDs may be used to indicate the states and/or priorities of the NE. For example, the NE #1 111 may advertise its route with the path "110 111" while the NE #2 112 may advertise its route with the path "110 112". In such a case, the NE #3 113 may distinguish the NE #1 111 from the NE #2 112 based on the received UPDATE messages as long as the NE #3 113 is aware of the agreement that "110 111" indicates a high priority NE and "110 112" indicates a low priority NE.

Referring back to FIG. 2A, the NE #1 111 with a high priority in the "Init" state may transmit an UPDATE message #1 comprising three repetitions of its AS ID "110" to the NE #3 113, and the UPDATE message #1 may be received and analyzed by the NE #3 113 to determine that the service may be accessed via the route specified in the UPDATE message #1, for example, by transmitting an access request to the IP address 100.100.1.1. Meanwhile, the NE #2 112 with a low priority in the "Init" state may also transmit an UPDATE message #2 comprising five repetitions of its AS ID "110" to the NE #3 113, and the UPDATE message #2 may be also received and analyzed by the NE #3 113 to determine that the service may also be accessed via the route specified in the UPDATE message #2. In such a case, the NE #3 113 may determine to access the service via the route specified in the UPDATE message #1, for example, due to a less number of repetitions of AS IDs in the UPDATE message #1.

Referring to FIG. 2B with reference to FIGS. 3A and 3B, the NE #1 111 and the NE #2 112 may discover each other. In some embodiments, the process of discovering may be performed by the operator or administrator of the network #1 110, for example, with provisioned configurations at the NE #1 111 and the NE #2 112. With the configurations, the NE #1 111 and the NE #2 112 may contact each other directly to confirm whether the other party is online or not. In some other embodiments, the process of discovering may be performed in an indirect manner. For example, when the NE #3 113 receives the UPDATE message #1, it may propagate the route specified in the UPDATE message #1 with its own UPDATE message, and finally the route may be propagated to the NE #2 112. Upon reception of the route advertised by the NE #1 111, the NE #2 112 may find that there are three repetitions of its own AS IDs in the received UPDATE message (shown in FIG. 2A), and then may determine that there is another NE (i.e., the NE #1 111) which is providing the service and having a high priority. Therefore, the NE #2 112 may contact the NE #1 111 for subsequent operations. Alternatively or additionally, the NE #1 111 may also discover the NE #2 112 via an UPDATE message which is generated at least partially based on the UPDATE message #2 from the NE #2 112, and then contact the NE #2 112 for subsequent operations.

As shown in FIG. 2B, when the NE #1 111 finds that there is no other route advertised for the same service or that there is no preferred route (which means that no other NE is currently serving as the active NE for the service), the NE #1 111 may change its state from "Init" to "Active-without-standby" as shown in FIG. 2B and FIG. 3A. Further, when the NE #2 112 finds that there is another route advertised by the NE #1 111, which has a higher priority, for the same service, the NE #2 112 may then change its state from "Init" to "Standby" as shown in FIG. 2B and FIG. 3B. After transitioning to the "Active" and "Standby" states, respectively, the NE #1 111 and the NE #2 112 may advertise their routes with corresponding numbers of repetitions of AS IDs, respectively, as shown in FIG. 2B. In such a case, the route specified in the UPDATE message #1 is the preferred route for the service.

Referring to FIG. 2C, after transitioning to the "Active-without-standby" state, the NE #1 111 may further transition to the state "Active-with-standby" when it discovers the NE

2 112, for example, by receiving an UPDATE message or by a provisioned configuration, as mentioned above.

After that, the NE #1 111 and the NE #2 112 may exchange information for the service and/or states with each other. For example, the NE #1 111 may transmit its service data to the NE #2 112 to have the NE #2 112 synchronized with the NE #1 111 periodically, such that the NE #2 112 may be ready for acting as the active NE for the service with a minimal loss of service data. For another example, the NE #1 111 and the NE #2 112 may transmit heartbeat signals to each other, such that they can be aware of the presence of each other and maintain their state machines accordingly.

FIG. 2D is a diagram illustrating a scenario where the NE #2 112 fails as a standby NE for the service. For example, the hardware of the NE #2 112 may fail or the network link to the NE #2 112 may fail. No matter how it fails, the NE #1 111 may detect such a failure, for example, by not receiving a heartbeat signal from the NE #2 112 for a certain period of time, or by receiving an UPDATE message in which the route advertised by the UPDATE message #2 is withdrawn. In such a case, the NE #1 111 may transition its state back to "Active-without-standby" state again, and stop exchange information with the NE #2 112.

Later, when the NE #2 112 comes back online, it may be operated according to the state machine shown in FIG. 3B, and the processes performed by the NE #2 112 shown in FIG. 2A to FIG. 2C may be repeated.

FIG. 2E to FIG. 2H are diagrams illustrating a scenario where the NE #1 111 fails as an active NE for the service and the NE #2 112 takes its place instead. As shown in FIG. 2E, when the NE #1 111 fails, the NE #3 113 may determine to change the preferred route for the service to the route advertised by the NE #2 112 because the NE #3 113 cannot receive any latest UPDATE message from the NE #1 111, or because the NE #3 113 receives, from a BGP peer of the NE #1 111, an UPDATE message in which the route advertised by the NE #1 111 is withdrawn.

Further, when the NE #1 111 fails, the NE #2 112 may detect such a failure, for example, by not receiving a heartbeat message from the NE #1 111 for a certain period of time or by receiving an UPDATE message in which the route advertised by the NE #1 111 is withdrawn. Upon detecting that the active NE for the service (i.e., the NE #1 111) is down, the NE #2 112 may transition to the "active-without-standby" state and advertise the route with one repetition of AS ID in its UPDATE message to the NE #3 113.

Referring to FIG. 2F, after a while, the NE #1 111 may come back online again, for example, because the NE #1 111 may be rebooted, or the network link for the NE #1 111 is recovered. At the time, the NE #1 111 may stay in the state of "Init" or "pending-standby", for example, depending on whether it is completely rebooted or not, and it may advertise its presence by transmitting an UPDATE message with three repetitions of its AS ID, just like that shown in FIG. 2A. Further, the NE #1 111 and the NE #2 112 may discover each other in a manner similar to that shown in FIG. 2B, and therefore the detailed description thereof is omitted for simplicity.

Referring to FIG. 2G, after transitioning to the "Active-without-standby" state, the NE #2 112 may further transition to the state "Active-with-standby" when it discovers the NE #1 111. In addition, after transitioning to the "Init" or "pending-standby" state, the NE #1 111 may further transition to the state "Standby" when it discovers the NE #2 112. After that, the NE #1 111 and the NE #2 112 may exchange information for the service and/or states with each other. For example, the NE #2 112 may transmit its service data to the NE #1 111 to have the NE #1 111 synchronized with the NE #2 112 periodically, such that the NE #1 111 may be ready for acting as the active NE for the service with a minimal loss of service data. For another example, the NE #2 112 and the NE #1 111 may transmit heartbeat signals to each other, such that they can be aware of the presence of each other and maintain their state machines accordingly. In this way, the NE #2 112 becomes the active NE for the service while the NE #1 111 becomes the standby NE for the service, which is opposite to that shown in FIG. 2C. The service may be provided in such a manner until the NE #2 112 is down for some reason.

Figure 2H:
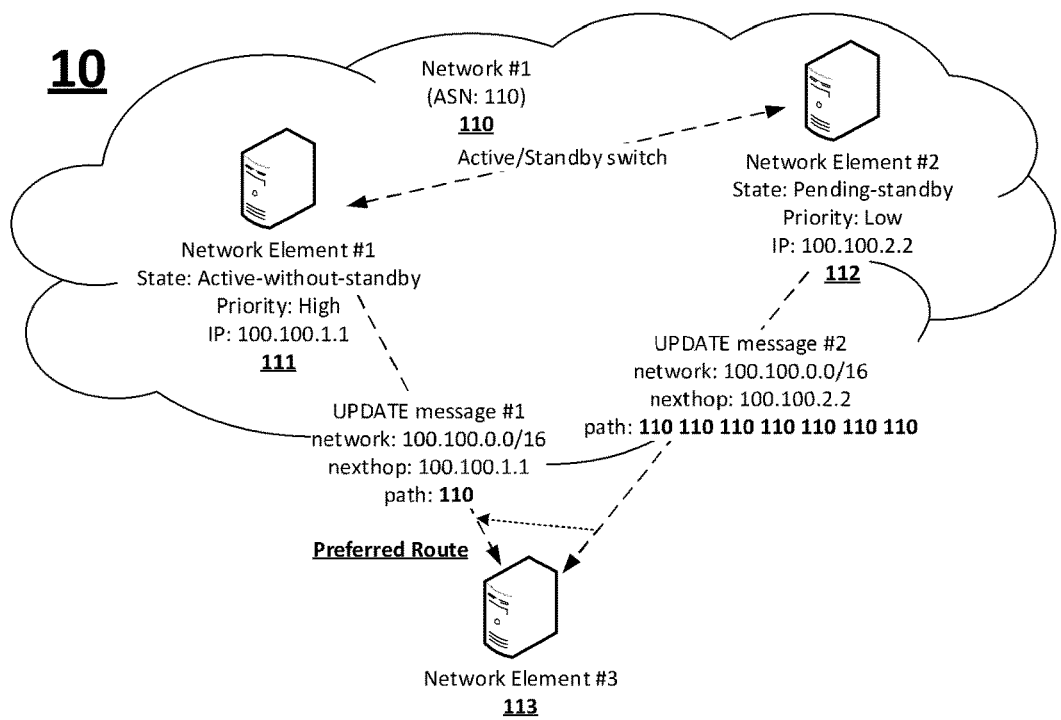

However, in some other embodiments, for example, in an embodiment where the NE #1 111 has more resources (e.g., processing power, network bandwidth, or the like) than those of the NE #2 112, the NE #1 111 and the NE #2 112 may exchange their roles for a better service performance. For example, after the service data is synchronized between the NE #1 111 and the NE #2 112 as shown in FIG. 2G, the NE #1 111 and/or the NE #2 112 may trigger an active/standby switching process, as shown in FIG. 2H, such that the NE #1 111 may become the active NE for the service and transition to the "active-without-standby" state again, while the NE #2 112 may become the standby NE and transition to the "pending-standby" state and finally to the "standby" state again. In such a case, the preferred route may be changed back to that advertised by the NE #1 111 for a better service performance.

Further, although some state transitions for the state machines shown in FIG. 3A and FIG. 3B are not shown in FIG. 2A to FIG. 2H, these can be easily contemplated by one skilled in the art from the state transitions shown in FIG. 2A to FIG. 2H. For example, the state transition from "active-without-standby" to "pending-standby" for both of the state machines, they are substantially similar to those from "active-with-standby" to "pending-standby" described with reference to FIG. 2E, FIG. 2F, and FIG. 2H.

Further, although the embodiments described with reference to FIG. 2A to FIG. 3B are described in the context of BGP protocol, the present disclosure is not limited thereto. For example, when another routing protocol or service advertisement mechanism is used, a similar inventive concept may also be applicable, which can be readily contemplated by one skilled in the art from the above teachings.

Next, some other embodiments will be described with reference to FIG. 4A to FIG. 4G. FIG. 4A to FIG. 4G are diagrams illustrating different stages of another exemplary scenario 20 in which a network redundancy mechanism according to another embodiment of the present disclosure is applied. The embodiment shown in FIG. 4A to FIG. 4G may be similar to that shown in FIG. 2A to FIG. 2H with the only difference that more NEs are involved in the embodiment shown in FIG. 4A to FIG. 4G. In other words, an 1-plus-1 model is described with reference to FIG. 2A to FIG. 2H while an n-plus-1 model will be described with reference to FIG. 4A to FIG. 4G in which one NE will become a standby NE for multiple other NEs for one or more services. Therefore, the repeated description of some processes and/or entities shown in FIG. 4A to FIG. 4G will be omitted for simplicity and brevity.

Figure 4A:
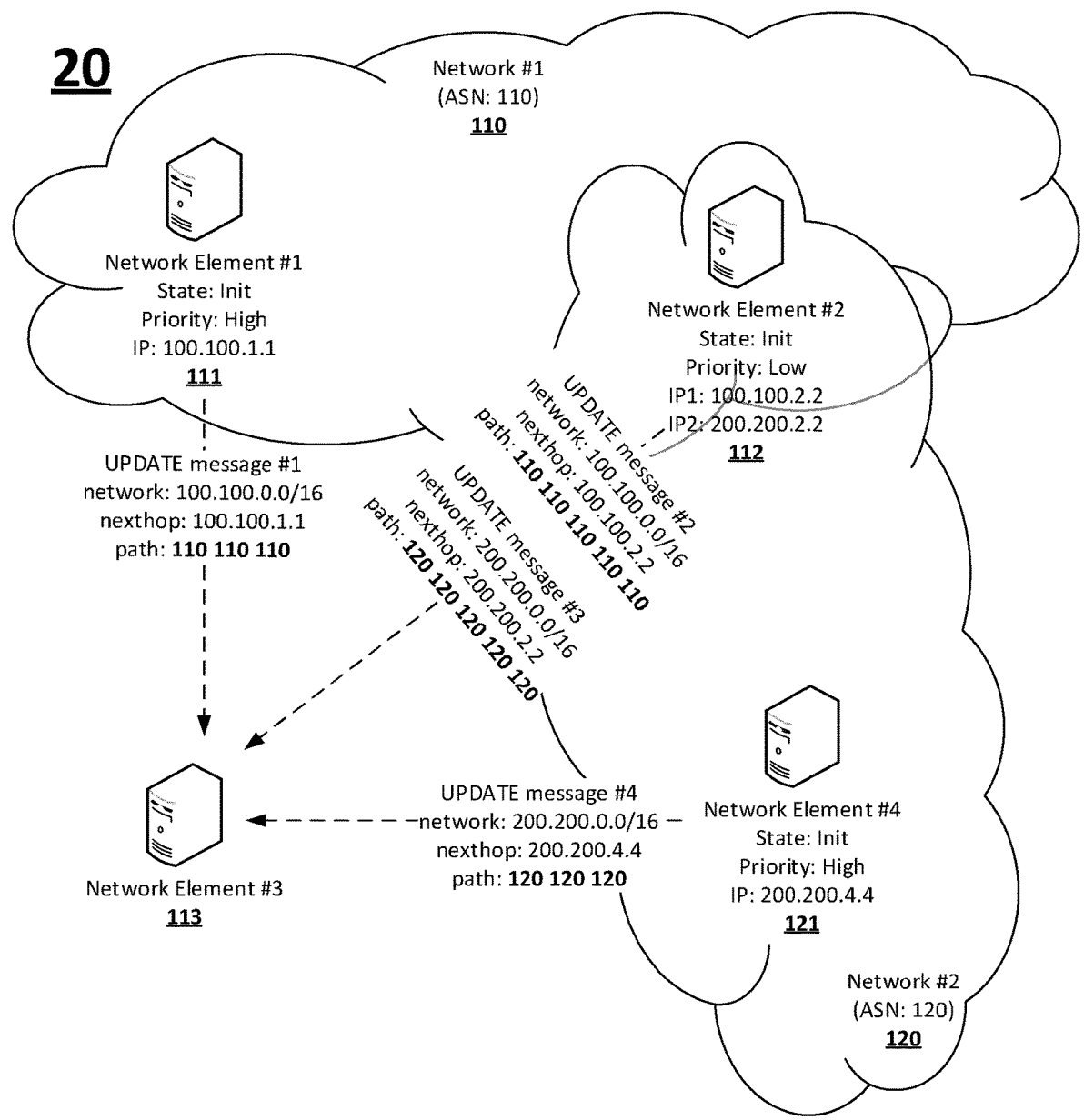
FIG. 4A to FIG. 4G are diagrams illustrating different stages of another exemplary scenario in which a network redundancy mechanism according to another embodiment of the present disclosure is applied.

As shown in FIG. 4A, the scenario 20 may involve two networks, a network #1 110 and a network #2 120. The network #1 110 may comprise a network element #1 111, which is expected to operate as the active NE, and a network element #2 112, which is expected to operate as the standby NE, similar to those shown in FIG. 2A to FIG. 2H. Further, the network #2 120 may comprise a network element #4 121, which is expected to operate as the active NE, and also the network element #2 112, which is expected to operate as the standby NE for the NE #4 121 as well. To this end, the NE #1 111 and the NE #4 121 may be assigned with a high priority while the NE #1 112 may be assigned with a low priority, and therefore they can be operated under the control of their state machines shown in FIG. 3A and FIG. 3B, respectively.

Although it is shown in FIG. 4A to FIG. 4G that two networks are involved, the present disclosure is not limited thereto. In some other embodiments, all the NEs may reside within a same network, e.g., the network #1 110, or reside within different networks with different AS numbers, respectively, or any configuration therebetween, e.g., the NE #1 111 and the NE #2 112 reside within the network #1 110 and the NE #4 121 resides within the network #2 120. Further, although it is shown that three NEs are used for describing a 2-plus-1 model, more NEs may be involved in other embodiments.

Referring back to FIG. 4A, when the NE #1 111, the NE #2 112, and the NE #4 121 are powered up and enter into their "Init" states, respectively, the NE #1 111 may advertise its route for a first service to the NE #3 113, for example, by a BGP UPDATE message #1 as shown in FIG. 4A. Similarly, the NE #2 112 and the NE #4 121 may advertise their routes for the first service and a second service to the NE #3 113, for example, by a BGP UPDATE message #2 for the first service, a BGP UPDATE message #3 for the second service, and a BGP UPDATE message #4 for the second service, respectively, as shown in FIG. 4A. Please note that although two services are described, the present disclosure is not limited thereto. In some other embodiments, the NEs may provide a same service or more than two services.

Upon reception of the UPDATE messages, the NE #3 may determine that the NE #1 111 is preferred to be the active NE over the NE #2 112 for the first service, and determine that the NE #4 121 is preferred to be the active NE over the NE #2 112 for the second service. In such a case, preferred routes for the services are determined.

Figure 4B:
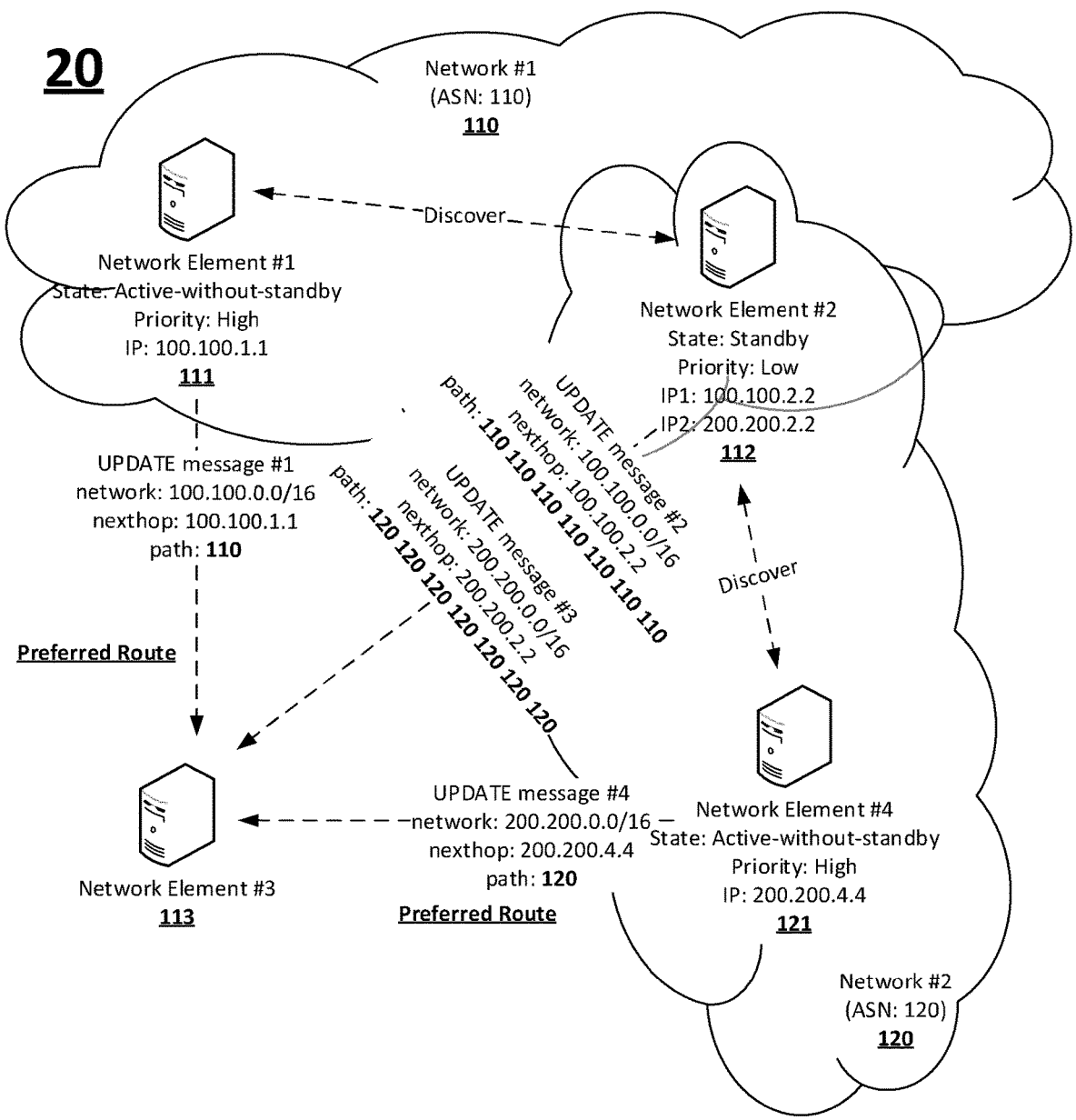

Referring to FIG. 4B, the NE #1 111 and the NE #2 112 may discover each other while the NE #4 121 and the NE #2 112 may discover each other. As shown in FIG. 4B, when the NE #1 111 finds that there is no other route advertised for the first service or that there is no preferred route for the first service, the NE #1 111 may change its state from "Init" to "Active-without-standby" as shown in FIG. 4B. Further, when the NE #2 112 finds that there is another route advertised by the NE #1 111 for the first service, which has a higher priority, the NE #2 112 may then change its state from "Init" to "Standby" as shown in FIG. 4B. After transitioning to the "Active" and "Standby" states, respectively, the NE #1 111 and the NE #2 112 may advertise their routes with corresponding numbers of repetitions of AS IDs, respectively, as shown in FIG. 4B. In such a case, the route specified in the UPDATE message #1 is the preferred route for the service. Similarly, the NE #4 1121 may change its state from "Init" to "Active-without-standby" as well.

Figure 4C:
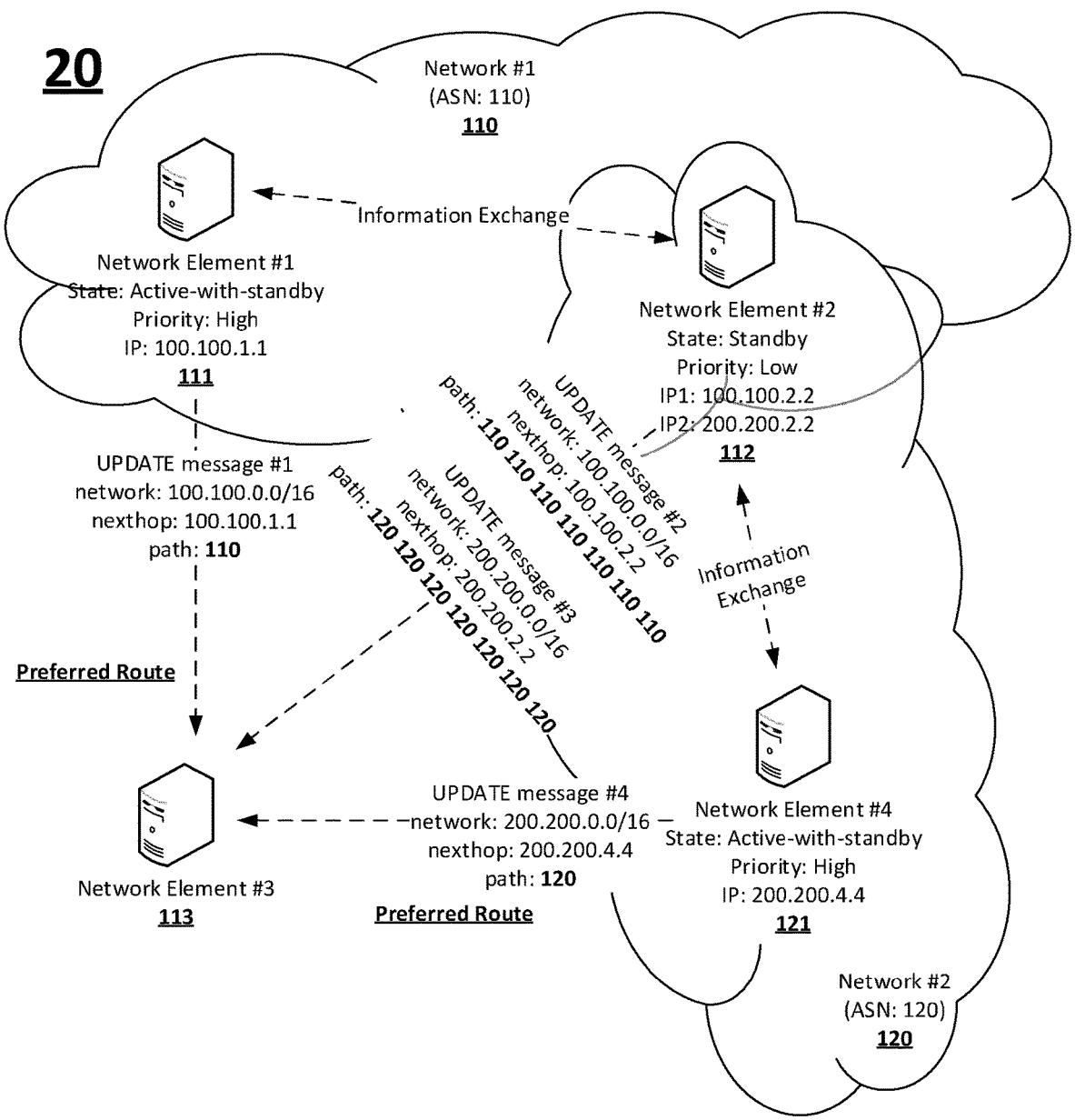

Referring to FIG. 4C, after transitioning to the "Active-without-standby" state, the NE #1 111 may further transition to the state "Active-with-standby" when it discovers the NE #2 112, for example, by receiving an UPDATE message or by a provisioned configuration, as mentioned above. Similarly, the NE #4 121 may further transition to the state "Active-with-standby" when it discovers the NE #2 112.

After that, the NE #1 111 and the NE #2 112 may exchange information for the first service and/or states with each other, while the NE #4 121 and the NE #2 112 may exchange information for the second service and/or states with each other.

Figure 4D:
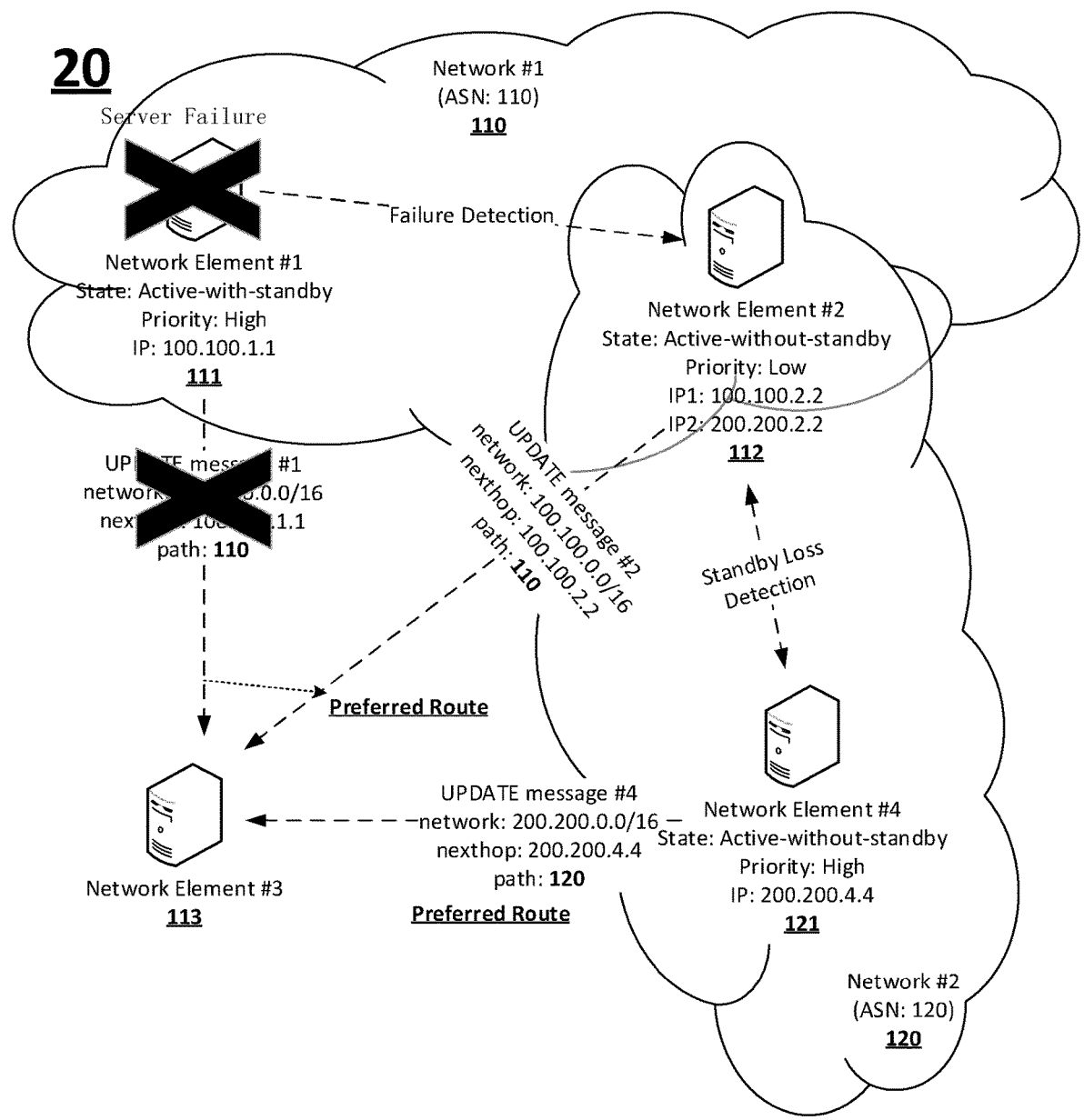

As shown in FIG. 4D, when the NE #1 111 fails, the NE #3 113 may determine to change the preferred route for the first service to the route advertised in the UPDATE message #2 by the NE #2 112 because the NE #3 113 cannot receive any latest UPDATE message from the NE #1 111, or because the NE #3 113 receives, from a BGP peer of the NE #1 111, an UPDATE message in which the route advertised by the NE #1 111 is withdrawn.

Further, when the network element #1 fails, the NE #2 112 may detect such a failure, for example, by not receiving a heartbeat message from the NE #1 111 for a certain period of time or by receiving an UPDATE message in which the route advertised by the NE #1 111 is withdrawn. Upon detecting that the active NE for the first service (i.e., the NE #1 111) is down, the NE #2 112 may transition to the "active-without-standby" state and advertise the route with one repetition of AS ID in its UPDATE message to the NE #3 113.

Further, as shown in FIG. 4D, when the NE #2 112 becomes the active NE for the first service, it can no longer serve as the standby NE for the second service, for example, due to a limited processing power, network bandwidth, or the like. In such a case, it may transmit a message to notify the NE #4 121 of such a situation, and the NE #4 121 will detect the loss of standby NE and transition to the state "active-without-standby". However, the present disclosure is not limited thereto. In some other embodiments, for example, an embodiment where the NE #2 112 has sufficient resources for handling the standby task, the NE #2 112 may keep serving as the standby NE for the second service while serving as the active NE for the first service.

Figure 4E:
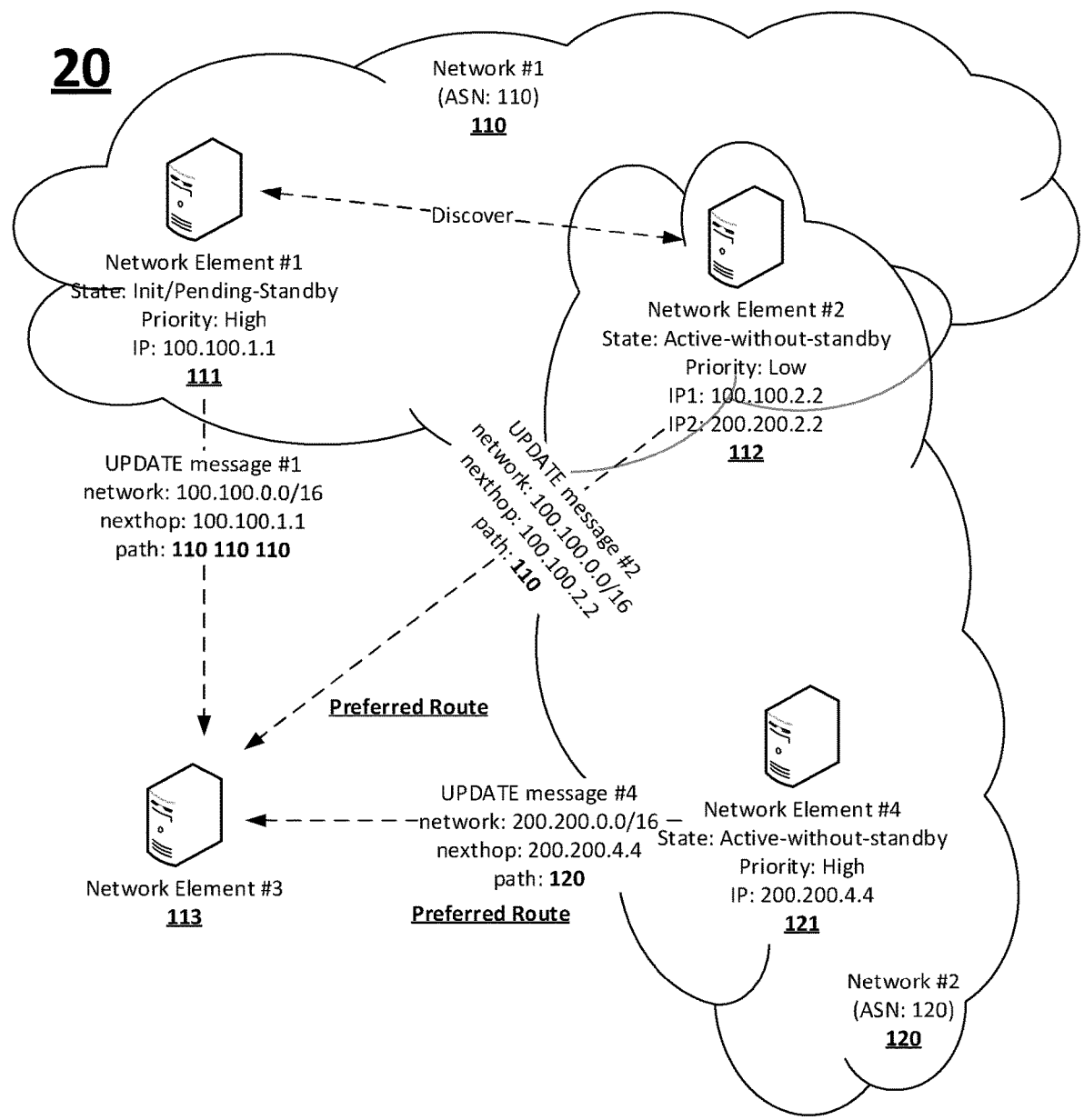

Referring to FIG. 4E, after a while, the NE #1 111 may come back online again, for example, because the NE #1 111 may be rebooted, or the network link for the NE #1 111 is recovered. At the time, the NE #1 111 may stay in the state of "Init" or "pending-standby", for example, depending on whether it is completely rebooted or not, and it may advertise its presence by transmitting an UPDATE message with three repetitions of its AS ID, just like that shown in FIG. 4A. Further, the NE #1 111 and the NE #2 112 may discover each other in a manner similar to that shown in FIG. 4B, and therefore the detailed description thereof is omitted for simplicity.

Figure 4F:
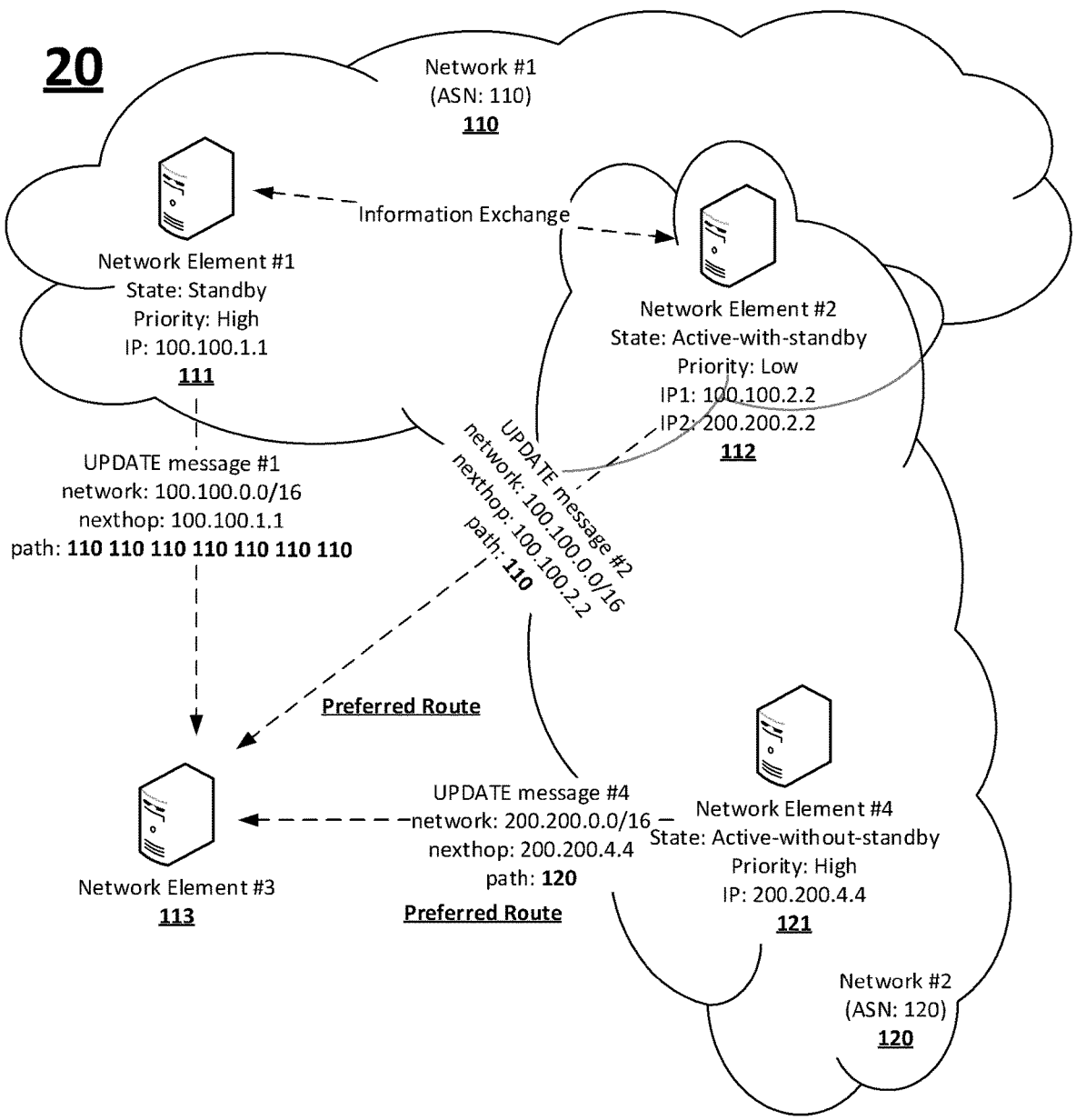

Referring to FIG. 4F, after transitioning to the "Active-without-standby" state, the NE #2 112 may further transition to the state "Active-with-standby" when it discovers the NE #1 111. After that, the NE #1 111 and the NE #2 112 may exchange information for the first service and/or states with each other. For example, the NE #2 112 may transmit its service data to the NE #1 111 to have the NE #1 111 synchronized with the NE #2 112 periodically, such that the NE #1 111 may be ready for acting as the active NE for the service with a minimal loss of service data. For another example, the NE #2 112 and the NE #1 111 may transmit heartbeat signals to each other, such that they can be aware of the presence of each other and maintain their state machines accordingly.

Figure 4G:
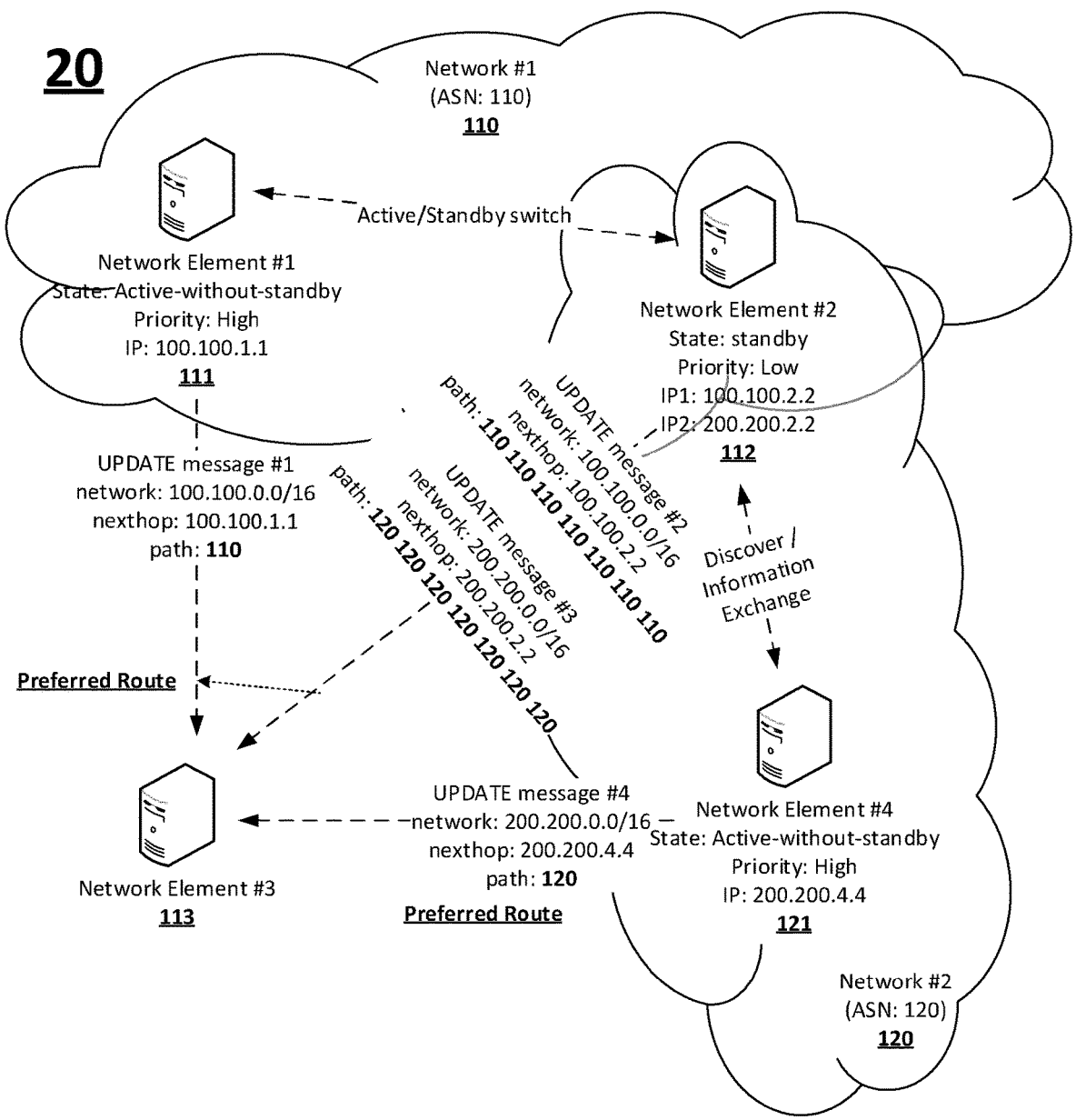

In this way, the NE #2 112 becomes the active NE for the first service while the NE #1 111 becomes the standby NE for the first service, which is opposite to that shown in FIG. 4C. Since the NE #2 112 is intended to serve as a standby NE for both services, the NE #1 111 and the NE #2 112 may exchange their roles for a better service performance. For example, after the service data is synchronized between the NE #1 111 and the NE #2 112 as shown in FIG. 4F, the NE #1 111 and/or the NE #2 112 may trigger an active/standby switching process, as shown in FIG. 4G, such that the NE #1 111 may become the active NE for the first service and transition to the "active-without-standby" state again, while the NE #2 112 may become the standby NE and transition to the "pending-standby" state again. In such a case, the preferred route may be changed back to that advertised by the NE #1 111 for a better service performance. Further, after the NE #2 112 becomes the standby NE for the first service, it may be discovered by the NE #4 121 again and become the standby NE for the second service as well, as shown in FIG. 4C.

Figure 5A:
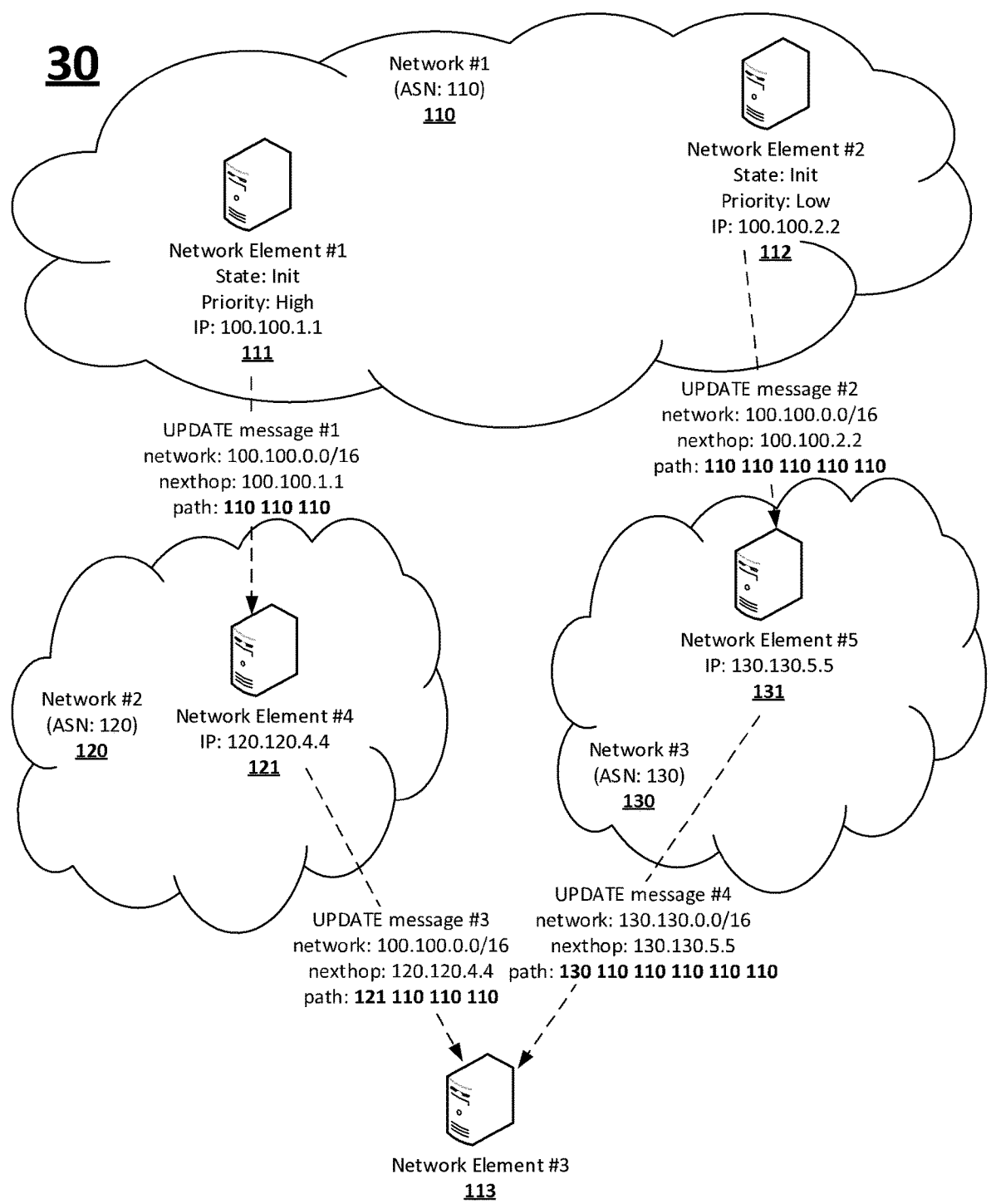
FIG. 5A and FIG. 5B are diagrams illustrating different stages of yet another exemplary scenario in which a network redundancy mechanism according to yet another embodiment of the present disclosure is applied.
Figure 5B:
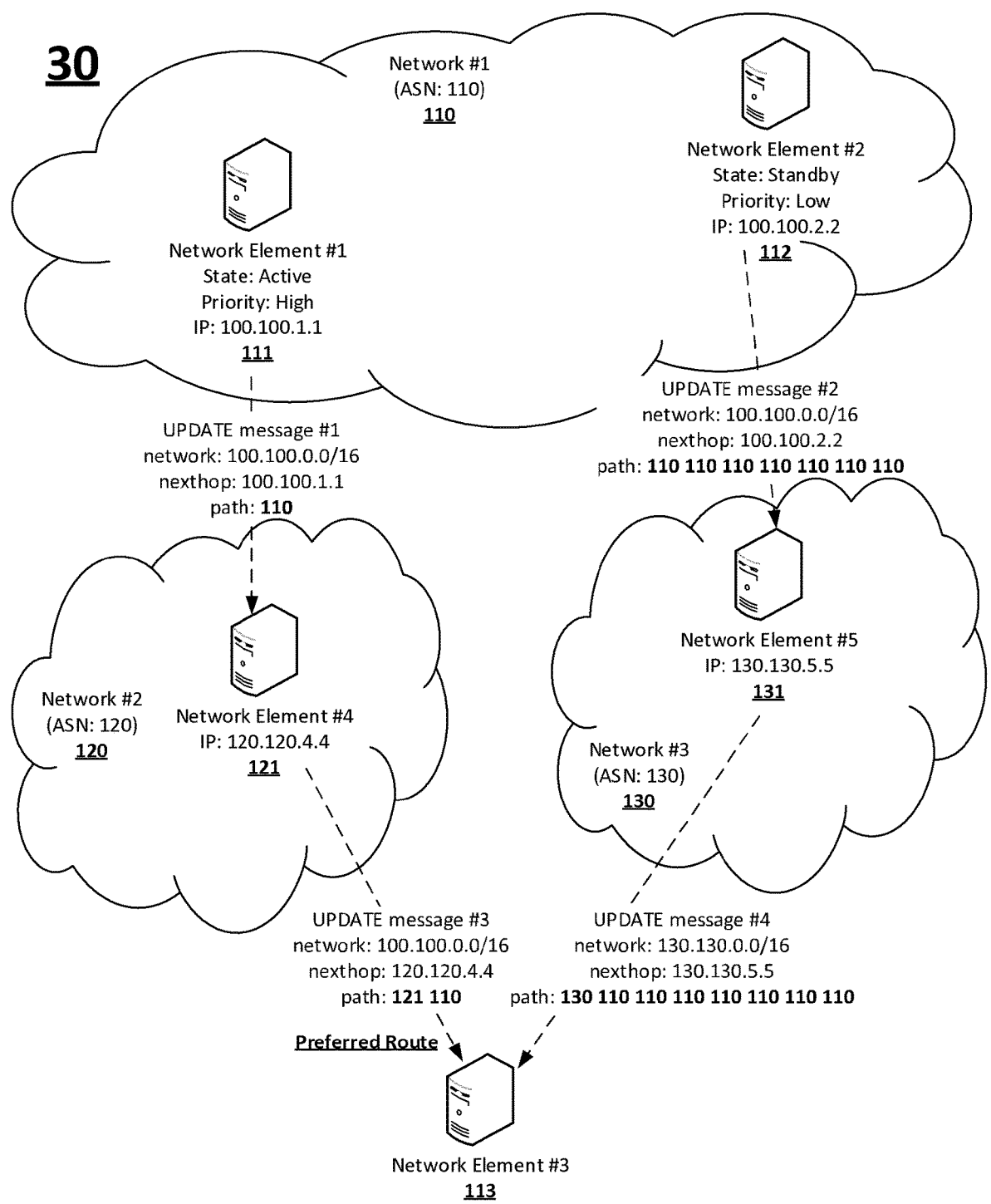

FIG. 5A and FIG. 5B are diagrams illustrating different stages of an exemplary scenario 30 in which a network redundancy mechanism according to yet another embodiment of the present disclosure is applied. The embodiment shown in FIG. 5A and FIG. 5B is substantially similar to that shown in FIG. 2A to FIG. 2H with the only difference that there are intermediate networks and NEs between the NEs shown in FIG. 2A to FIG. 2H, and therefore repeated description will be omitted for simplicity and brevity.

As shown in FIG. 5A, the network #1 110 may comprise a network element #1 111, which is expected to operate as the active NE, and a network element #2 112, which is expected to operate as the standby NE, similar to those shown in FIG. 2A. Further, there is a network #2 120 comprising an NE #4 121 between the NE #1 111 and the NE #3 113, and there is a network #3 130 comprising an NE #5 131 between the NE #2 112 and the NE #3 113. The NE #4 121 and/or the NE #5 131 may or may not be aware of the network redundancy mechanism according to some embodiments of the present disclosure, and therefore they may be operated according to a conventional manner, for example, according to the BGP protocol.

As shown in FIG. 5A, upon reception of the UPDATE message #1 from the NE #1 111, the NE #4 121 may compose its own UPDATE message #3 based on the received UPDATE message #1, for example, by appending its own AS ID "120" into the path attribute of the UPDATE message #3 according to the BGP protocol. Similarly, upon reception of the UPDATE message #2 from the NE #2 112, the NE #5 131 may compose its own UPDATE message #4 based on the received UPDATE message #2, for example, by appending its own AS ID "130" into the path attribute of the UPDATE message #4 according to the BGP protocol. Both of the UPDATE messages #3 and #4 are propagated to the NE #3 113, and the NE #3 may determine that the preferred route is the route specified in the UPDATE message #3 since there is less repetitions of the AS IDs in the UPDATE message #3, as shown in FIG. 5B. For similar reasons, the NE #1 111 and the NE #2 112 may still automatically recognize their roles correctly based on the received routes which are advertised from each other and their own priorities, even when some intermediate networks and/or NEs may not support the network redundancy mechanism.

With the network redundancy mechanism described with reference to FIG. 2A to FIG. 5B, NEs may automatically reach an agreement for a preferred route for a service without user's manual configuration and knowledge of the network. Further, with the network redundancy mechanism, multiple NEs may share one single standby NE for geographical redundancy. A similar high availability level, compared with one plus one model, can be achieved with less NEs. Further, even if there are intermediate NEs/networks which do not support the mechanism, the embodiments of the present disclosure may still function properly.

Figure 6:
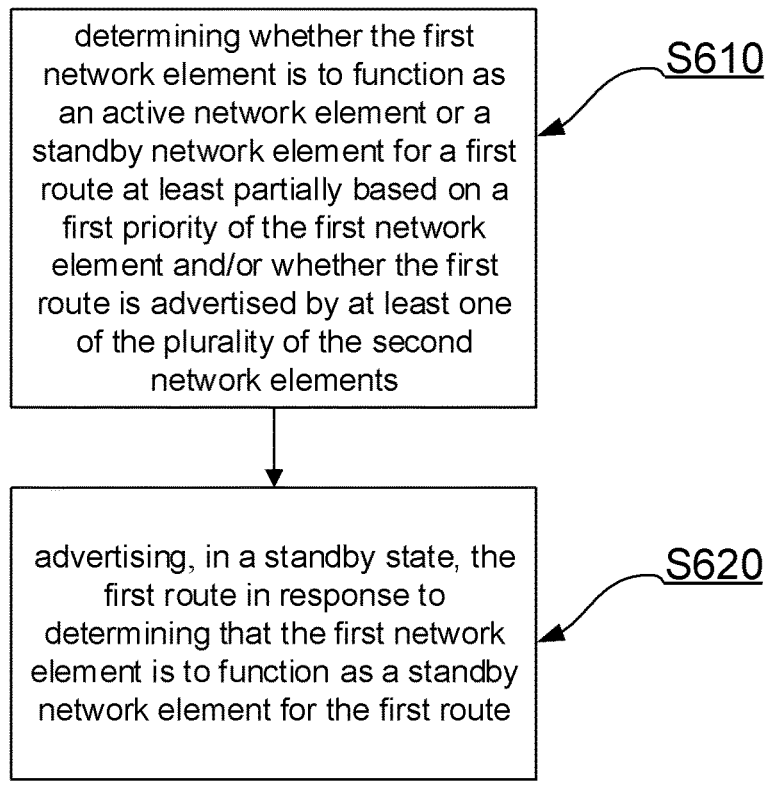
FIG. 6 is a flow chart illustrating an exemplary method at a network element for network redundancy according to an embodiment of the present disclosure.

FIG. 6 is a flow chart of an exemplary method 600 for providing a service in a redundant manner according to an embodiment of the present disclosure. The method 600 may be performed at a network element (e.g., the NE #1 111, the NE #2 112, and/or the NE #4 121). The method 600 may comprise step S610 and step S620. However, the present disclosure is not limited thereto. In some other embodiments, the method 600 may comprise more steps, less steps, different steps, or any combination thereof. Further, the steps of the method 600 may be performed in a different order than that described herein. Further, in some embodiments, a step in the method 600 may be split into multiple sub-steps and performed by different entities, and/or multiple steps in the method 600 may be combined into a single step.

The method 600 may begin at step S610 where it is determined whether the first network element is to function as an active network element or a standby network element for a first route at least partially based on a first priority of the first network element and/or whether the first route is advertised by at least one of the plurality of the second network elements.

At step S620, the first route may be advertised in a standby state in response to determining that the first network element is to function as a standby network element for the first route.

In some embodiments, the step of determining whether the first network element is to function as an active network element or a standby network element for a first route comprises: determining that the first network element is to function as an active network element for the first route in response to determining that the first priority is high and that the first route is not advertised by any of the plurality of second network elements during a period of time, wherein the method further comprises: advertising, in an active-without-standby state, the first route. In some embodiments, the method may further comprises: receiving, from one of the plurality of second network elements, a message indicating that the second network element is a standby network element for the first route; and advertising, in an active-with-standby state, the first route. In some embodiments, the method may further comprise: determining the second network element is no longer the standby network element for the first route by not receiving a heartbeat message from the second network element for a period of time; and advertising, in an active-without-standby state, the first route. In some embodiments, the method may further comprise: advertising that the first route is withdrawn in response to determining that the first network element cannot provide the service for the first route any longer. In some embodiments, the method may further comprise: advertising, in a standby state, the first route in response to determining that the first network element is to function as a standby network element for the first route by receiving an advertisement from a second network element advertising the first route. In some embodiments, the method may further comprise: advertising, in an active-without-standby state, the first route in response to determining that the first network element is to function as an active network element for the first route by receiving an advertisement in which the first route is withdrawn by a second network element.

In some embodiments, the step of determining whether the first network element is to function as an active network element or a standby network element for a first route may comprise: determining that the first network element is to function as a standby network element in response to determining that the first priority is high and that the first route is advertised by one of the plurality of second network elements.

In some embodiments, the step of determining whether the first network element is to function as an active network element or a standby network element for a first route may comprise: determining that the first network element is to function as a standby network element for the first route in response to determining that the first priority is low and that the first route is advertised by one of the plurality of second network elements. In some embodiments, the method may further comprise: advertising, in an active-without-standby state, the first route in response to determining that the first network element is to function as an active network element for the first route by receiving an advertisement in which the first route is withdrawn by a second network element. In some embodiments, the method may further comprise: receiving, from one of the plurality of second network elements, a message indicating that the second network element is a standby network element for the first route; and advertising, in an active-with-standby state, the first route. In some embodiments, the method may further comprise: receiving, from the second network element or another second network element, a message indicating that the second network element is no longer the standby network element for the first route; and advertising, in an active-without-standby state, the first route. In some embodiments, the method may further comprise: advertising that the first route is withdrawn in response to determining that the first network element cannot provide the service for the first route any longer. In some embodiments, the method may further comprise: advertising, in a standby state, the first route in response to determining that the first network element is to function as a standby network element for the first route by receiving an advertisement from a second network element advertising the first route.

In some embodiments, the method may further comprise: determining that the first network element is to function as a standby network element for one or more additional routes in response to determining that the one or more additional routes are advertised by one or more second network elements. In some embodiments, the method may further comprise: determining that the first network element is to function as an active network element for a route selected from the first route and the one or more additional routes in response to an advertisement in which the selected route is withdrawn is received; advertising, in an active-without-standby state, the selected route; advertising that the first route and the one or more additional routes other than the selected route is withdrawn; and transmitting, to the each of the second network elements other than the second network element corresponding to the selected route, a message indicating that the first network element is no longer a standby network element for a corresponding route.

In some embodiments, each of the first network element and the plurality of second network elements supports the Border Gateway Protocol (BGP), and a route is advertised by a corresponding network element by using an autonomous system (AS) identifier of the corresponding network element in a path field of the route. In some embodiments, a network element in an active state, a network element in a standby state, and a network element in other states advertise their routes with pre-configured AS identifiers which are different from each other, respectively. In some embodiments, AS identifiers pre-configured for a network element in an active state, a network element in a standby state, and a network element in other states have different numbers of repetitions of the AS identifiers, respectively. In some embodiments, a network element in other states may advertise its route with a number of repetitions of a pre-configured AS identifier based on its priority. In some embodiments, a network element in an active state may have a fewer number of repetitions of the AS identifier than a network element with a priority of high in other states, which may have a fewer number of repetitions of the AS identifier than a network element with a priority of low in other states, which may have a fewer number of repetitions of the AS identifier than a network element in a standby state.

Figure 7:
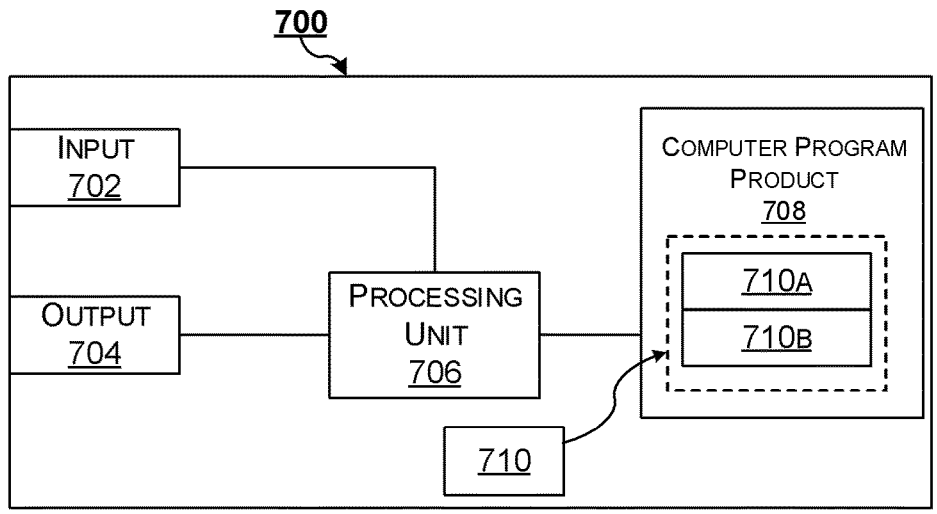
FIG. 7 schematically shows an embodiment of an arrangement which may be used in a network element according to an embodiment of the present disclosure.

FIG. 7 schematically shows an embodiment of an arrangement 700 which may be used in a network element (e.g., the NE #1 111, the NE #2 112, and/or the NE #4 121) according to an embodiment of the present disclosure. Comprised in the arrangement 700 are a processing unit 706, e.g., with a Digital Signal Processor (DSP) or a Central Processing Unit (CPU). The processing unit 706 may be a single unit or a plurality of units to perform different actions of procedures described herein. The arrangement 700 may also comprise an input unit 702 for receiving signals from other entities, and an output unit 704 for providing signal(s) to other entities. The input unit 702 and the output unit 704 may be arranged as an integrated entity or as separate entities.

Furthermore, the arrangement 700 may comprise at least one computer program product 708 in the form of a non-volatile or volatile memory, e.g., an Electrically Erasable Programmable Read-Only Memory (EEPROM), a flash memory and/or a hard drive. The computer program product 708 comprises a computer program 710, which comprises code/computer readable instructions, which when executed by the processing unit 706 in the arrangement 700 causes the arrangement 700 and/or the network elements in which it is comprised to perform the actions, e.g., of the procedure described earlier in conjunction with FIG. 2A to FIG. 6 or any other variant.

The computer program 710 may be configured as a computer program code structured in computer program modules 710A and 710B. Hence, in an exemplifying embodiment when the arrangement 700 is used in a first network element, the code in the computer program of the arrangement 700 includes: a determining module 710A for determining whether the first network element is to function as an active network element or a standby network element for a first route at least partially based on a first priority of the first network element and/or whether the first route is advertised by at least one of the plurality of the second network elements; and an advertising module 710B for advertising, in a standby state, the first route in response to determining that the first network element is to function as a standby network element for the first route.

The computer program modules could essentially perform the actions of the flow illustrated in FIG. 2A to FIG. 6, to emulate the network element. In other words, when the different computer program modules are executed in the processing unit 706, they may correspond to different modules in the network element.

Although the code means in the embodiments disclosed above in conjunction with FIG. 7 are implemented as computer program modules which when executed in the processing unit causes the arrangement to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

Figure 8:
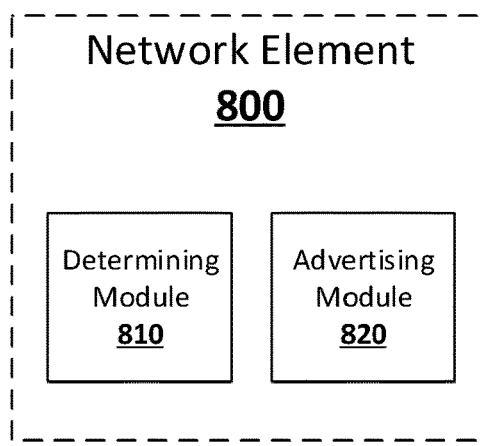
FIG. 8 is a block diagram of an exemplary network element according to an embodiment of the present disclosure.

Correspondingly to the method 600 as described above, an exemplary network element is provided. FIG. 8 is a block diagram of a network element 800 according to an embodiment of the present disclosure.

The network element 800 can be configured to perform the method 600 as described above in connection with FIG. 6. As shown in FIG. 8, the network element 800 may comprise a determining module 810 for determining whether the network element is to function as an active network element or a standby network element for a first route at least partially based on a first priority of the first network element and/or whether the first route is advertised by at least one of a plurality of second network elements; and an advertising module 820 for advertising, in a standby state, the first route in response to determining that the first network element is to function as a standby network element for the first route.

The above modules 810 and/or 820 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2A to FIG. 6. Further, the network element 800 may comprise one or more further modules, each of which may perform any of the steps of the method 600 described with reference to FIG. 6.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method at a first network element for providing a service together with a plurality of second network elements in a redundant manner, the method comprising:
   determining whether the first network element is to function as an active network element or a standby network element for a first route at least partially based on a first priority of the first network element and/or whether the first route is advertised by at least one of the plurality of the second network elements, wherein the determining comprises determining that the first network element is to function as an active network element for the first route in response to determining that the first priority is high and that the first route is not advertised by any of the plurality of second network elements during a period of time; and
   advertising, in a standby state, the first route in response to determining that the first network element is to function as a standby network element for the first route; and
   advertising, in an active-without-standby state, the first route in response to determining that the first network element is to function as the active network element.

2. The method of claim 1, further comprising:
   receiving, from one of the plurality of second network elements, a message indicating that the second network element is a standby network element for the first route; and
   advertising, in an active-with-standby state, the first route.

3. The method of claim 2, further comprising:
   determining the second network element is no longer the standby network element for the first route by not receiving a heartbeat message from the second network element for a period of time; and
   advertising, in an active-without-standby state, the first route.

4. The method of claim 1, further comprising:
   advertising that the first route is withdrawn in response to determining that the first network element cannot provide the service for the first route any longer.

5. The method of claim 4, further comprising:
   advertising, in a standby state, the first route in response to determining that the first network element is to function as a standby network element for the first route by receiving an advertisement from a second network element advertising the first route.

6. The method of claim 5, further comprising:
   advertising, in an active-without-standby state, the first route in response to determining that the first network element is to function as an active network element for the first route by receiving an advertisement in which the first route is withdrawn by a second network element.

7. The method of claim 1, wherein the step of determining whether the first network element is to function as an active network element or a standby network element for a first route comprises:
   determining that the first network element is to function as a standby network element in response to determining that the first priority is high and that the first route is advertised by one of the plurality of second network elements.

8. The method of claim 1, wherein the step of determining whether the first network element is to function as an active network element or a standby network element for a first route comprises:
   determining that the first network element is to function as a standby network element for the first route in response to determining that the first priority is low and that the first route is advertised by one of the plurality of second network elements.

9. The method of claim 8, further comprising:
   advertising, in an active-without-standby state, the first route in response to determining that the first network element is to function as an active network element for the first route by receiving an advertisement in which the first route is withdrawn by a second network element.

10. The method of claim 9, further comprising:
receiving, from one of the plurality of second network elements, a message indicating that the second network element is a standby network element for the first route; and
advertising, in an active-with-standby state, the first route.

11. The method of claim 10, further comprising:
receiving, from the second network element or another second network element, a message indicating that the second network element is no longer the standby network element for the first route; and
advertising, in an active-without-standby state, the first route.

12. The method of claim 9, further comprising:
advertising that the first route is withdrawn in response to determining that the first network element cannot provide the service for the first route any longer.

13. The method of claim 12, further comprising:
advertising, in a standby state, the first route in response to determining that the first network element is to function as a standby network element for the first route by receiving an advertisement from a second network element advertising the first route.

14. The method of claim 8, further comprising:
determining that the first network element is to function as a standby network element for one or more additional routes in response to determining that the one or more additional routes are advertised by one or more second network elements.

15. The method of claim 14, further comprising:
determining that the first network element is to function as an active network element for a route selected from the first route and the one or more additional routes in response to an advertisement in which the selected route is withdrawn is received;
advertising, in an active-without-standby state, the selected route;
advertising that the first route and the one or more additional routes other than the selected route is withdrawn; and
transmitting, to the each of the second network elements other than the second network element corresponding to the selected route, a message indicating that the first network element is no longer a standby network element for a corresponding route.

16. The method of claim 1, wherein each of the first network element and the plurality of second network elements supports the Border Gateway Protocol (BGP), and a route is advertised by a corresponding network element by using an autonomous system (AS) identifier of the corresponding network element in a path field of the route.

17. The method of claim 16, wherein a network element in an active state, a network element in a standby state, and a network element in other states advertise their routes with pre-configured AS identifiers which are different from each other, respectively.

18. The method of claim 17, wherein AS identifiers pre-configured for a network element in an active state, a network element in a standby state, and a network element in other states have different numbers of repetitions of the AS identifiers, respectively.

19. A first network element for providing a service together with a plurality of second network elements in a redundant manner, the first network element comprising:
a processor;
a memory storing instructions which, when executed by the processor, cause the processor to:
determine whether the first network element is to function as an active network element or a standby network element for a first route at least partially based on a first priority of the first network element and/or whether the first route is advertised by at least one of the plurality of the second network elements, wherein the determining comprises: determining that the first network element is to function as an active network element for the first route in response to determining that the first priority is high and that the first route is not advertised by any of the plurality of second network elements during a period of time;
advertise, in a standby state, the first route in response to determining that the first network element is to function as a standby network element for the first route; and
advertise, in an active-without-standby state, the first route in response to determining that the first network element is to function as the active network element.

* * * * *